(12) United States Patent
Shah et al.

(10) Patent No.: US 11,992,990 B2
(45) Date of Patent: May 28, 2024

(54) BARRIER-ENHANCED POLYMERIC FILM STRUCTURES, METHODS OF PREPARATION, AND ARTICLES THEREOF

(71) Applicant: Superior Plastics Extrusion Co. Inc., Putnam, CT (US)

(72) Inventors: Jimmy A. Shah, Rockingham, NC (US); Hari Parvatareddy, Appleton, WI (US)

(73) Assignee: Superior Plastics Extrusion Co. Inc., Putnam, CT (US)

( * ) Notice: Subject to any disclaimer, the term of this patent is extended or adjusted under 35 U.S.C. 154(b) by 246 days.

(21) Appl. No.: 17/402,908

(22) Filed: Aug. 16, 2021

(65) Prior Publication Data

US 2022/0212389 A1    Jul. 7, 2022

Related U.S. Application Data

(60) Provisional application No. 63/184,650, filed on May 5, 2021, provisional application No. 63/173,784, filed on Apr. 12, 2021, provisional application No. 63/065,662, filed on Aug. 14, 2020.

(51) Int. Cl.

| | | |
|---|---|---|
| B29C 48/08 | (2019.01) | |
| C08J 5/18 | (2006.01) | |
| C08L 23/08 | (2006.01) | |
| C08L 23/12 | (2006.01) | |
| C08L 67/00 | (2006.01) | |
| C08L 77/00 | (2006.01) | |
| B29K 23/00 | (2006.01) | |
| B29K 67/00 | (2006.01) | |
| B29K 77/00 | (2006.01) | |

(52) U.S. Cl.
CPC ............ *B29C 48/08* (2019.02); *C08J 5/18* (2013.01); *C08L 23/08* (2013.01); *C08L 23/12* (2013.01); *C08L 67/00* (2013.01); *C08L 77/00* (2013.01); *B29K 2023/06* (2013.01); *B29K 2023/086* (2013.01); *B29K 2023/12* (2013.01); *B29K 2067/00* (2013.01); *B29K 2077/00* (2013.01); *B29K 2995/0065* (2013.01); *B29K 2995/0068* (2013.01); *B29K 2995/0082* (2013.01)

(58) Field of Classification Search
CPC .. B29C 48/08; C08J 5/18; C08L 23/12; C08L 77/00; C08L 67/00; C08L 23/08; B29K 2023/12
USPC ....................................... 428/515
See application file for complete search history.

(56) References Cited

U.S. PATENT DOCUMENTS

| | | |
|---|---|---|
| 3,595,740 A | 7/1971 | Gerow |
| 4,211,595 A | 7/1980 | Samour |
| 4,275,119 A | 6/1981 | Weiner |
| 4,275,120 A | 6/1981 | Weiner |
| 4,289,727 A | 9/1981 | Herrington, Jr. |
| 4,291,092 A | 9/1981 | Weiner |
| 4,297,411 A | 10/1981 | Weiner |
| 4,339,493 A | 7/1982 | Weiner |
| 4,339,494 A | 7/1982 | Weiner |
| 4,339,495 A | 7/1982 | Weiner |
| 4,339,496 A | 7/1982 | Weiner |
| 4,339,497 A | 7/1982 | Weiner |
| 4,339,498 A | 7/1982 | Weiner |
| 4,340,640 A | 7/1982 | Weiner |
| 4,340,641 A | 7/1982 | Weiner |
| 4,364,989 A | 12/1982 | Moyle |
| 4,394,485 A | 7/1983 | Adur |
| 4,643,928 A | 2/1987 | Kimura |
| 4,725,466 A | 2/1988 | Crass |
| 4,777,081 A | 10/1988 | Crass |
| 4,904,325 A | 2/1990 | Crass |
| 4,917,925 A | 4/1990 | Loretti |
| 4,925,728 A | 5/1990 | Crass |
| 5,002,624 A | 3/1991 | Howell |
| 5,091,237 A * | 2/1992 | Schloegl ................. B32B 27/18 525/240 |
| 5,147,346 A | 9/1992 | Cancio |
| 5,234,733 A | 8/1993 | Schloegl |

(Continued)

FOREIGN PATENT DOCUMENTS

WO    2021140382 A1    7/2021

OTHER PUBLICATIONS

Hyperform HPN 909ei High Performance Additive for PP, Milliken, Flyer dated Feb. 24, 2021, 2 pages.

*Primary Examiner* — Hui H Chin
(74) *Attorney, Agent, or Firm* — BakerHostetler

(57) ABSTRACT

This invention generally relates to polyethylene or ethylene/α-olefin copolymer based co-extruded, multi-layer films or sheets—rigid or flexible—for thermoforming into shaped containers such as packaging containers. Inter alia, the rigid films have improved barrier properties, toughness, and snapability. Particularly, the films of the present invention comprise one or more stacks of polypropylene layers. In one embodiment, the polypropylene layers in the stack are provided such that any two adjacent layers have different microstructures that provide a interface or interphase between the two layers with likely different microstructures and/or crystallinity. The overall polypropylene stack structure assists in disrupting the transport of oxygen, thereby providing a laminate or structure, for example a rigid film or sheet, with enhanced oxygen-barrier properties. The invention also relates a process for preparing shaped articles such as containers from such films, and to such shaped articles—rigid or flexible—both filled and unfilled.

31 Claims, 5 Drawing Sheets

(56) References Cited

U.S. PATENT DOCUMENTS

| | | |
|---|---|---|
| 5,538,590 A | 7/1996 | Riley |
| 5,733,617 A | 3/1998 | Baduel |
| 5,792,549 A | 8/1998 | Wilkie |
| 5,830,561 A | 11/1998 | Hagner |
| 5,972,520 A | 10/1999 | Howell |
| 6,221,483 B1 | 4/2001 | Hilston |
| 6,423,420 B1 | 7/2002 | Brant |
| 6,475,633 B1 | 11/2002 | Robert |
| 6,669,887 B2 | 12/2003 | Hilston |
| 6,750,288 B2 | 6/2004 | Pradel |
| 6,884,846 B2 | 4/2005 | Pradel |
| 6,890,661 B2 | 5/2005 | Pradel |
| 7,067,196 B2 | 6/2006 | Pradel |
| 7,445,840 B2 | 11/2008 | Moriya |
| 7,510,775 B2 | 3/2009 | Pradel |
| 7,750,081 B2 | 7/2010 | Rhee |
| 9,018,310 B2 | 4/2015 | Palama |
| 9,327,856 B2 | 5/2016 | Kastens |
| 9,440,757 B2 | 9/2016 | Kastens |
| 9,878,515 B2 | 1/2018 | Remmers |
| 10,000,043 B2 | 6/2018 | Robert |
| 10,066,066 B2 | 9/2018 | Denis |
| 2001/0006711 A1 | 7/2001 | Nageli |
| 2002/0006482 A1 | 1/2002 | Falla |
| 2002/0071960 A1 | 6/2002 | Peiffer |
| 2002/0142116 A1 | 10/2002 | Jud |
| 2003/0148119 A1 | 8/2003 | Su |
| 2006/0006564 A1 | 1/2006 | Maldas |
| 2006/0014036 A1 | 1/2006 | Kendig |
| 2007/0007682 A1 | 1/2007 | Maldas |
| 2007/0190277 A1 | 8/2007 | Jud |
| 2008/0029917 A1 | 2/2008 | Maldas |
| 2008/0286547 A1* | 11/2008 | Hubbard .................... C08J 5/18 524/394 |
| 2009/0176912 A1 | 7/2009 | Maldas |
| 2009/0186183 A1 | 7/2009 | Michel |
| 2009/0220718 A1* | 9/2009 | Isoyama .................. B32B 27/28 428/36.7 |
| 2009/0292055 A1 | 11/2009 | Jarus |
| 2010/0062274 A1 | 3/2010 | Leth |
| 2010/0081755 A1 | 4/2010 | Rhee |
| 2010/0081760 A1 | 4/2010 | Rhee |
| 2011/0305896 A1 | 12/2011 | Campbell |
| 2012/0241352 A1 | 9/2012 | Pramanik |
| 2013/0336362 A1 | 12/2013 | Onishi |
| 2014/0199505 A1 | 7/2014 | Lorenzetti |
| 2014/0357145 A1 | 12/2014 | Remmers |
| 2015/0111986 A1 | 4/2015 | Geng |
| 2015/0360448 A1 | 12/2015 | Crawford |
| 2016/0288464 A1 | 10/2016 | Morita |
| 2019/0217586 A1 | 7/2019 | Kawakita |
| 2020/0307056 A1 | 10/2020 | Macinnis |
| 2021/0206954 A1 | 7/2021 | Mahan |

* cited by examiner

BARRIER-ENHANCED POLYMERIC FILM STRUCTURES, METHODS OF PREPARATION, AND ARTICLES THEREOF

CROSS REFERENCE TO RELATED APPLICATIONS

This application claims the benefit of U.S. Provisional Patent Application No. 63/065,662, filed on Aug. 14, 2020, U.S. Provisional Patent Application No. 63/173,784, filed on Apr. 12, 2021, and U.S. Provisional Patent Application No. 63/184,650, filed on May 5, 2021, the entireties of which are incorporated herein for any and all purposes.

FIELD OF INVENTION

This invention relates to packaging applications. It generally relates to polyethylene or ethylene/α-olefin copolymer based co-extruded, multi-layer films or sheets—rigid or flexible—for thermoforming into shaped containers such as packaging containers. Inter alia, the films have improved barrier properties, toughness, and snapability. Particularly, the films of the present invention comprise one or more stacks of polypropylene layers. In one embodiment, the polypropylene layers in the stack are provided such that any two adjacent layers have different microstructures that provide a interface or interphase between the two layers with likely different microstructures and/or crystallinity. The overall polypropylene stack structure assists in disrupting the transport of oxygen, thereby providing a laminate or structure, for example a rigid film or sheet, with enhanced oxygen-barrier properties. The invention also relates a process for preparing shaped articles such as containers from such films, and to such shaped articles—rigid or flexible—both filled and unfilled.

BACKGROUND

Packaging is an important component for the preservation and transport of many items, consumer or industrial. Food and drink products, household chemicals, cosmetics, consumer goods, medical goods, and industrial goods are examples of areas where packaging plays an important role in preserving and transferring products. Historically, ceramic, metal, and glass were utilized for storage and transport. However, mobility associated with modern life has created a demand for more flexibility in container design and reduction in costs associated with packaging and transport. Development of polymeric materials and associated processing techniques fulfilled this demand by introducing opportunities for replacement of historical materials with polymeric solutions. However, many current solutions have limited recycle value which negatively impacts sustainability. The present invention addresses the issue of recyclability and sustainability.

In the rigid polymeric containers space, the containers are made using equipment such as form-fill-seal (FFS), wherein rolls of film are unwound to thermoform into containers. Such rigid containers are used inter alia in the following industries: (1) food; (2) medical; (3) cosmetics; (4) automotives; and (5) electronics. Rigid plastic sheets for preparing such containers are made from polystyrene (PS), high-impact polystyrene (HIPS), polyethylene terephthalate (PET), polylactic acid (PLA), polypropylene (PP), and such.

Polypropylene is the second largest volume commodity thermoplastic in the world after polyethylene. Generally, polyethylene is preferred for packaging applications in various food, medical, commodity, and automotive applications. While polypropylene does exhibit high heat resistance, optical clarity, flexibility, low temperature impact properties, and overall structural rigidity, it is not a preferred material for such applications. Particularly in barrier applications, that is when barrier to oxygen and moisture transport is sought, polystyrene is preferred.

Barrier properties in terms of inhibiting oxygen transfer and moisture transfer are desired in such rigid plastic sheets to avoid spoilage of goods and for extension of shelf-life especially in foods and drinks area where it is by definition, limited. Currently available barrier materials include the high-cost and high-density barrier films such as ethylene-vinyl alcohol (EVOH) or polyamide (PA, PA6, PA66) that are then used with traditional substrate materials such as polystyrene and polypropylene, either as a lamination or in a multilayer coextrusion process.

In general, polymeric materials that serve as a barrier to water vapor and certain gases, such as oxygen and/or carbon dioxide, may be utilized to form shaped polymeric articles that serve as packaging materials. For instance, such effectiveness with respect to the barrier properties can allow for the polymeric materials and resulting shaped polymeric articles to extend the shelf-life of the product stored therein.

The barrier properties for water vapor and gases can vary depending on the particular polymeric material utilized. For instance, some polymeric materials have been discovered that efficiently serve as a good barrier material for water vapor and a poor barrier material for gases while other polymeric materials serve as a poor barrier material for water vapor and a good barrier material for gases. In certain instances, techniques or treatments can be employed to provide a polymeric material that may serve as an effective barrier for both water vapor and these gases. However, these treatments may affect the aesthetic properties (e.g., clarity) of the packaging material and may also adversely affect the mechanical properties of such material, in particular when the materials have relatively greater thicknesses.

Aside from the barrier properties, mechanical properties, and optical properties, certain polymeric materials may also not be as effective in forming a shaped polymeric article according to certain forming or molding processes. Finally, recycling of some current polymeric materials can be complicated by certain techniques or treatments used to create barrier performance, resulting in undesirable and inefficient waste streams.

Another desired property is the processability of polymers for making the rigid films. For example, polystyrene is an amorphous thermoplastic polymer that has high mechanical strength, lower shrinkage rate, and a wide processing window. It is considered as the standard material for commodity product and packaging application for its ease of processing, be it with injection molding or extrusion/thermoforming/form-fill-seal processing.

In comparison, polypropylene is a semi-crystalline thermoplastic polymer that has good mechanical properties, high heat and chemical resistance but has much higher shrinkage rate with narrow processing window. Thus, for applications using extrusion, thermoforming, and form-fill-seal processing techniques, polystyrene provides clear advantage over polypropylene. Furthermore, polypropylene requires auxiliary heating and cooling, apart from the higher shrinkage rate.

The rigid films of the present invention comprising stacks of polypropylene layers offer replacement of the above polymeric sheets for container packaging with improved properties, at a lower cost, and without sacrificing the performance criteria for packaging containers in the fields described supra. Despite comprising polypropylene, the rigid films of the present invention have a lower shrinkage rate and process similar to polystyrene.

In fact, the rigid films of the present invention offer high performance in terms of oxygen transmission rate and moisture-vapor transmission rate that are comparable to traditional polypropylene and polystyrene. Thus, it is a low-cost barrier option for extended shelf life, for example in rigid-container applications. These rigid films also demonstrate comparable toughness and snapability. In summary, these films show (i) amenability to processing on existing equipment designed for traditional polypropylene or polystyrene, but with reduced shrinkage, and (ii) compatibility with the existing lamination, printing, thermoforming, and form-fill-seal process. Finally, despite such desirable properties and processability, the rigid films of the present invention provide a lighter material with high recycling capability compared to the traditional high-density thermoplastics, thus improving downstream sustainability.

As a result, there is a need to provide a shaped polymeric article having improved aesthetic properties that serves as an effective barrier for water vapor and certain gases while also exhibiting desired physical properties that are sustainable through multiple uses or life cycles. While the description of the illustrative embodiments is focused on rigid sheets, the invention applies equally to flexible sheets and semi-rigid sheets.

SUMMARY OF THE INVENTION

In one embodiment, this invention relates to a co-extruded multi-layer polymeric film, comprising at least one 2-layer stack A–B1 or A–B2, wherein the first layer of the 2-layer stack is A and the second layer of the 2-layer stack is either B1 or B2, wherein:
  A is a layer comprising predominately polypropylene,
  B1 is a layer comprising predominately polypropylene and 50 wt. % or less of a hydrocarbon resin, and
  B2 is a layer comprising predominately IMPEDE® polymer; and
  wherein said two layers in said 2-layer stack are contactably adjacent each other.

In another embodiment, this invention relates to a co-extruded multi-layer polymeric film as recited above, further comprising one layer from the following set of layers, or more than one layer from the following set of layers:
  (A) at least one layer comprising predominately polyolefin;
  (B) at least one layer comprising predominately polypropylene;
  (C) at least one layer comprising predominately IMPEDE®;
  (D) at least one layer comprising predominately polypropylene and 50 wt. % or less of a hydrocarbon resin;
  (E) at least one layer comprising predominately polyethylene polymer or interpolymer;
  (F) at least one barrier layer comprising EVOH;
  (G) at least one barrier layer comprising predominately nylon;
  (H) at least one barrier layer, comprising predominately polyester;
  (I) at least one tie layer; and
  (J) a combination of the above layers.

In yet another embodiment, this invention relates to a co-extruded multi-layer polymeric film as recited above, comprising:
  (I) an outside layer comprising polyethylene;
  (II) a core layer comprising EVOH; and
  (III) an inside layer comprising polyethylene;
  wherein at least one of the three layers above, comprises the 2-layer stack.

In one embodiment, this invention relates to a co-extruded multi-layer polymeric film as recited above, wherein the outside layer and the inside layer comprise the 2-layer stack.

In another embodiment, this invention relates to a co-extruded multi-layer polymeric film as recited above, comprising three layers in the following order:
  (I) a first layer comprising predominately polypropylene;
  (II) a second layer comprising:
    (a) predominately polypropylene and 50 wt. % or less of a hydrocarbon resin, or
    (b) predominately IMPEDE® polymer; and
  (III) a third layer comprising predominately polypropylene.

In yet another embodiment, this invention relates to a co-extruded multi-layer polymeric film, comprising:
  (I) an outside layer stack, comprising one or more layers, wherein:
    (A) optionally at least one layer of said outside layer stack comprises polyethylene polymer or polyethylene interpolymer; and
    (B) optionally said outside layer stack comprises at least one 2-layer stack of:
      (i) a layer comprising predominately polypropylene; and
      (ii) a layer comprising:
        (a) predominately polypropylene and 50 wt. % or less of a hydrocarbon resin, or
        (b) predominately IMPEDE® polymer;
      wherein the two layers in said 2-layer stack are contactably adjacent each other;
  (II) a core layer stack comprising, one or more layers, wherein:
    (C) optionally at least one layer of said core layer stack comprises polyethylene polymer or polyethylene interpolymer; and
    (D) optionally said core layer stack comprises at least one 2-layer stack of:
      (iii) a layer comprising predominately polypropylene; and
      (iv) a layer comprising:
        (a) predominately polypropylene and 50 wt. % or less of a hydrocarbon resin, or
        (b) predominately IMPEDE® polymer;
      wherein the two layers in said 2-layer stack are contactably adjacent each other; and
    (E) optionally at least one layer of said core layer stack comprises EVOH; and
  (III) an inside layer stack, comprising one or more layers, wherein:
    (F) optionally at least one layer of said inside layer stack comprises polyethylene polymer or polyethylene interpolymer; and
    (G) optionally said inside layer stack comprises at least one 2-layer stack of:
      (v) a layer comprising predominately polypropylene; and
      (vi) a layer comprising:
        (a) predominately polypropylene and 50 wt. % or less of a hydrocarbon resin, or
        (b) predominately IMPEDE® polymer;
      wherein the two layers in said 2-layer stack are contactably adjacent each other;

wherein said polyethylene interpolymer comprises:
  (a) optionally a first ethylene/α-olefin copolymer fraction having a density in the range of 0.894 to 0.908 g/cm$^3$; a melt index in the range of 0.2 to 1 dg/min; and
  (b) optionally a second ethylene/α-olefin copolymer fraction having a density in the range of from about 0.910 to 0.924 g/cm$^3$, a melt index in the range from 0.5 to 2 g/10 min, a zero shear viscosity ratio (ZSVR) in the range of from about 1.15 to 2.5; a molecular weight distribution, expressed as the ratio of the weight average molecular weight to number average molecular weight (Mw/Mn), in the range of 2.0 to 4.0.

In one embodiment, this invention relates to a co-extruded multi-layer polymeric film as recited above, comprising a number of layers selected from the range of 2 layers through 100 layers.

In another embodiment, this invention relates to a co-extruded multi-layer polymeric film as recited above, wherein the weight percent of said EVOH copolymer to that of said co-extruded multi-layer polymeric film is in the range of from about 0.1% to about 10%.

In yet another embodiment, this invention relates to a co-extruded multi-layer polymeric film as recited above, wherein the mole percent of ethylene in said EVOH copolymer is in the range of from about 10% to about 55%.

In one embodiment, this invention relates to a co-extruded multi-layer polymeric film as recited above, wherein the co-extruded multi-layer polymeric film exhibits a DTUL of 30° C. or more and a flexural secant modulus of 500 MPa or more.

In another embodiment, this invention relates to a co-extruded multi-layer polymeric film as recited above, wherein the thickness of the film ranges from about 5 μm to about 1600 μm.

In yet another embodiment, this invention relates to a co-extruded multi-layer polymeric film as recited above, wherein the hydrocarbon resin in the second layer B1 comprises an aliphatic hydrocarbon resin, an aliphatic/aromatic hydrocarbon resin, an aromatic hydrocarbon resin, a polyterpene resin, a terpene-phenol resin, a rosin ester, a rosin acid, or a mixture thereof.

In one embodiment, this invention relates to a co-extruded multi-layer polymeric film as recited above, wherein the hydrocarbon resin in the second layer B1 is partially hydrogenated or fully hydrogenated.

In another embodiment, this invention relates to a co-extruded multi-layer polymeric film as recited above, wherein the hydrocarbon resin in the second layer B1 comprises a polycyclopentadiene.

In yet another embodiment, this invention relates to a co-extruded multi-layer polymeric film as recited above, wherein the hydrocarbon resin in the second layer B1 has a weight average molecular weight of from about 400 g/mol to about 5,000 g/mol.

In one embodiment, this invention relates to a co-extruded multi-layer polymeric film as recited above, wherein the hydrocarbon resin comprises an aromatic C$_9$ hydrogenated resin having a ring and ball softening point of about 110° C. or more.

In another embodiment, this invention relates to a co-extruded multi-layer polymeric film as recited above, which is characterized by a water vapor transmission rate of 3.0 cm$^3$/m$^2$/day, or less, and/or an oxygen transmission rate of 60 cm$^3$/100 in$^2$/day, or less.

In yet another embodiment, this invention relates to a co-extruded multi-layer polymeric film as recited above, wherein the second layer B1 further comprises a nucleating agent selected from sodium benzoate, talc, glycerol alkoxide salts, cyclic carboxylic acid salts, bicyclic carboxylic acid salts, glycerolates, phosphines, phosphates, diols, hexahydrophtalic acid salts, amides, and sugar alcohols.

In one embodiment, this invention relates to a co-extruded multi-layer polymeric film as recited above, wherein said nucleating agent is selected from:
mannitol or mannitol based compounds; sorbitol or sorbitol based compounds; nonitol or nonitol based compounds, 1,2,3-trideoxy-4,6:5,7-bis-0-((4-propylphenyl) methylene) nonitol;
2,4,8,10-tetra(tert-butyl)-6-hydroxy-12H-dibenzo[d,g][1,3,2]diox-aphosphocin 6-oxide; a salt of 2,4,8,10-tetra(tert-butyl)-6-hydroxy-12H-dibenzo[d,g][1,3,2]diox-aphosphocin 6-oxide; sodium salt of 2,4,8,10-tetra(tert-butyl)-6-hydroxy-12H-dibenzo[d,g][1,3,2]diox-aphosphocin 6-oxide;
hydroxy-bis[2,2'-methylenebis[4,6-di(tert-butyl)phenyl] phosphate; 2,2'-methylenebis(4,6-di-tert-butylphenyl) phosphate; a salt thereof; a sodium salt thereof; an aluminum salt thereof; a lithium salt thereof;
(1R)-1-[(4R,4aR,8aS)-2,6-bis(3,4-dimethylphenyl)-4,4a,8,8a-tetrahydro-[1,−3]dioxino[5,4-d][1,3]dioxin-4-yl]ethane-1,2-diol; 1-[8-propyl-2,6-bis(4-propylphenyl)-4,4a,8,8a-tetrahydro-[1,3]dioxino[5,4--d][1,3]dioxin-4-yl] ethane-1,2-diol;
N-[3,5-bis(2,2-dimethylpropanoylamino)phenyl]-2,2-dimethylpropanamide); a salt of (1S,2R)-cyclohexane-1,2-dicarboxylate with zinc octadecenoate; a calcium salt of (1S,2R)-cyclohexane-1,2-dicarboxylate with zinc octadecenoate; cis-endo-bicyclo[2,2,1]heptane-2,3-dicarboxylic acid disodium salt with 13-docosenamide; amorphous silicon dioxide;
bicycloheptane dicarboxylic acid; bicyclo [2.2.1] heptane dicarboxylate;
cyclohexanedicarboxylic acid; a calcium salt of cyclohexanedicarboxylic acid; a blend of cyclohexanedicarboxylic acid, the calcium salt of cyclohexanedicarboxylic acid, and zinc stearate; and
a mixture of two or more nucleating agents thereof.

In another embodiment, this invention relates to a shaped polymeric article comprising the co-extruded multi-layer polymeric film as recited above.

In yet another embodiment, this invention relates to a shaped polymeric article as recited above, wherein the shaped polymeric article is a thermoformed shaped polymeric article.

In one embodiment, this invention relates to a shaped polymeric article as recited above, which is a container for packaging food product.

In another embodiment, this invention relates to a container as recited above, wherein, the co-extruded multi-layer polymeric film further comprises one layer from the following set of layers, or more than one layer from the following set of layers:
  (A) at least one layer comprising predominately polyolefin;
  (B) at least one layer comprising predominately polypropylene;
  (C) at least one layer comprising predominately IMPEDE®;
  (D) at least one layer comprising predominately polypropylene and 50 wt. % or less of a hydrocarbon resin;

(E) at least one layer comprising predominately polyethylene polymer or interpolymer;
(F) at least one barrier layer comprising EVOH;
(G) at least one barrier layer comprising predominately nylon;
(H) at least one barrier layer, comprising predominately polyester;
(I) at least one tie layer; and
(J) a combination of the above layers.

In yet another embodiment, this invention relates to a container as recited above, wherein said co-extruded multi-layer polymeric film comprises:
(I) an outside layer comprising polyethylene;
(II) a core layer comprising EVOH; and
(III) an inside layer comprising polyethylene;
wherein at least one of the three layers above, comprises said 2-layer stack.

In one embodiment, this invention relates to a container as recited above, wherein said outside layer and said inside layer comprise the 2-layer stack.

In another embodiment, this invention relates to a container as recited above, wherein the co-extruded multi-layer polymeric film comprises three layers in the following order:
(I) a first layer comprising predominately polypropylene;
(II) a second layer comprising:
  (a) predominately polypropylene and 50 wt. % or less of a hydrocarbon resin, or
  (b) predominately IMPEDE® polymer; and
(III) a third layer comprising predominately polypropylene.

In yet another embodiment, this invention relates to a container as recited above, wherein the co-extruded multi-layer polymeric film comprises:
(I) an outside layer stack, comprising one or more layers, wherein:
  (A) optionally at least one layer of said outside layer stack comprises polyethylene polymer or polyethylene interpolymer; and
  (B) optionally said outside layer stack comprises at least one 2-layer stack of:
    (i) a layer comprising predominately polypropylene; and
    (ii) a layer comprising:
      (a) predominately polypropylene and 50 wt. % or less of a hydrocarbon resin, or
      (b) predominately IMPEDE® polymer;
    wherein the two layers in said 2-layer stack are contactably adjacent each other;
(II) a core layer stack comprising, one or more layers, wherein:
  (C) optionally at least one layer of said core layer stack comprises polyethylene polymer or polyethylene interpolymer; and
  (D) optionally said core layer stack comprises at least one 2-layer stack of:
    (iii) a layer comprising predominately polypropylene; and
    (iv) a layer comprising:
      (a) predominately polypropylene and 50 wt. % or less of a hydrocarbon resin, or
      (b) predominately IMPEDE® polymer;
    wherein the two layers in said 2-layer stack are contactably adjacent each other; and
  (E) optionally at least one layer of said core layer stack comprises EVOH; and
(III) an inside layer stack, comprising one or more layers, wherein:
  (F) optionally at least one layer of said inside layer stack comprises polyethylene polymer or polyethylene interpolymer; and
  (G) optionally said inside layer stack comprises at least one 2-layer stack of:
    (v) a layer comprising predominately polypropylene; and
    (vi) a layer comprising:
      (a) predominately polypropylene and 50 wt. % or less of a hydrocarbon resin, or
      (b) predominately IMPEDE® polymer;
    wherein the two layers in said 2-layer stack are contactably adjacent each other;
wherein said polyethylene interpolymer comprises:
  (a) optionally a first ethylene/α-olefin copolymer fraction having a density in the range of 0.894 to 0.908 g/cm$^3$; a melt index in the range of 0.2 to 1 dg/min; and
  (b) optionally a second ethylene/α-olefin copolymer fraction having a density in the range of from about 0.910 to 0.924 g/cm$^3$, a melt index in the range from 0.5 to 2 g/10 min, a zero shear viscosity ratio (ZSVR) in the range of from about 1.15 to 2.5; a molecular weight distribution, expressed as the ratio of the weight average molecular weight to number average molecular weight (Mw/Mn), in the range of 2.0 to 4.0.

In one embodiment, this invention relates to a container as recited above, wherein the co-extruded multi-layer polymeric film comprises a number of layers selected from the range of 2 layers through 100 layers.

In another embodiment, this invention relates to a container as recited above, wherein the weight percent of said EVOH copolymer to that of said co-extruded multi-layer polymeric film is in the range of from about 0.1% to about 10%.

In yet another embodiment, this invention relates to a container as recited above, wherein the mole percent of ethylene in said EVOH copolymer is in the range of from about 10% to about 55%.

In one embodiment, this invention relates to a process for preparing a co-extruded multi-layer polymeric film as recited above, comprising the steps of:
(I) providing the layer A1, and
(II) providing the layer comprising B1 or B2;
wherein said A1 and said B1 or A1 and B2 form an interface or interphase at their adjacent boundaries such that the interphase provides discontinuity in properties between the two layers to provide improvement in barrier properties of the co-extruded multi-layer polymeric film.

In another embodiment, this invention relates to a container for packaging food product prepared from a rigid co-extruded multi-layer polymeric film prepared by the process recited above.

In yet another embodiment, this invention relates to a shaped article as described above, wherein the shaped polymeric article is a thermoformed shaped polymeric article.

In one embodiment, this invention relates to a laminated structure comprising a co-extruded multi-layer polymeric film, wherein:
the polymeric film comprises at least one 2-layer stack A–B1 or A–B2:
  wherein the first layer of the 2-layer stack is A and the second layer of the 2-layer stack is either B1 or B2;

wherein A is a layer comprising predominately polypropylene;

wherein B1 is a layer comprising predominately polypropylene and 50 wt. % or less of a hydrocarbon resin;

wherein B2 is a layer comprising predominately IMPEDE® polymer;

wherein said two layers in said 2-layer stack are contactably adjacent each other; and wherein the laminate structure thickness is in the range of 5 μm to 1600 μm.

DETAILED DESCRIPTION OF THE ILLUSTRATIVE EMBODIMENTS

Figure 1:
FIG. 1 shows multilayer embodiments of the rigid film of the present invention.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

I. Definitions and Terms

All percentages expressed in the present patent application are by weight of the total weight of the composition unless expressed otherwise.

All ratios expressed in this patent application are on a weight:weight basis unless expressed otherwise.

Ranges are used as shorthand only to avoid listing and describing each and every value within the range. Any appropriate value within the range can be selected as the upper value, the lower value, or the end-point of the range.

The singular form of a word includes its plural, and vice versa, unless the context clearly dictates otherwise. Thus, references "a," "an," and "the" generally include the plurals of the respective terms they qualify. For example, reference to "a method" includes its plural-"methods." Similarly, the terms "comprise," "comprises," and "comprising," whether used as a transitional phrase in the claims or otherwise, should be interpreted inclusively rather than exclusively. Likewise, the terms "include," "including," and "or" should be construed to be inclusive, unless such a construction is clearly prohibited from the context. Similarly, the term "examples," particularly when followed by a listing of terms, is merely exemplary and illustrative and should not be deemed to be exclusive or comprehensive.

The terms "comprising," "including," "having," and their derivatives, are not intended to exclude the presence of any additional component, step, or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step or procedure not specifically delineated or listed.

Methods, compositions, and other advances disclosed in this patent application are not limited to particular methodology, protocols, and reagents described in the application because, as the skilled artisan will appreciate, they may vary. Further, the terminology used in this application describes particular embodiments only, and should not be construed as limiting the scope of what is disclosed or claimed.

Unless defined otherwise, all technical and scientific terms, terms of art, and acronyms used in the present application have the meanings commonly understood by one of ordinary skill in the art in the field(s) of the invention, or in the field(s) where the term is used. Although any compositions, methods, articles of manufacture, or other means or materials similar or equivalent to those described in the present patent application can be used in the practice of the present invention, specific compositions, methods, articles of manufacture, or other means or materials are described only for exemplification.

All patents, patent applications, publications, technical and/or scholarly articles, and other references cited or referred to in this patent application are incorporated in their entirety by reference to the extent allowed by law. The discussion of those references is intended merely to summarize the assertions made in these references. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), copolymer and interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and one or more additional α-olefin monomers. The term "ethylene/α-olefin interpolymer" includes ethylene/α-olefin copolymers, as well as terpolymers and other polymers derived from multiple monomers.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "EVOH" as used herein, refers to a polymer comprising repeating units of ethylene and vinyl alcohol. As is generally known in the art the weight ratio of the ethylene to vinyl alcohol defines the barrier properties. Such polymers and their methods of manufacture are generally known in the art.

As used herein "density" is determined by ASTM D 792 and "melt-index" by ASTM D 1238. The "melting point" of a polymer is measured as the peak melting point when performing differential scanning calorimetry (DSC) as described in ASTM Procedure D3417-83 (rev. 88).

II. Polymeric Film Structures

Generally, this invention relates to polymeric film structures that comprise at least one stack of co-extruded polypropylene ("PP") layers. The polymeric film structures may comprise one or more other layers as described herein and in the art.

In one embodiment, generally, this invention relates to a rigid film or rigid sheet that comprises at least one stack of polypropylene ("PP") layers. Such rigid film is characterized inter alia by enhanced barrier properties, stiffness, toughness, and/or snapability. In another embodiment, generally, this invention relates to a flexible film or a flexible sheet that comprises at least one stack of polypropylene ("PP") layers. Such flexible film is characterized inter alia by enhanced barrier properties, stiffness, and toughness.

In another embodiment, generally, this invention relates to a rigid film or rigid sheet that comprises at least one stack of polypropylene ("PP") layers that may be coextruded or laminated. In another embodiment, generally, this invention relates to a flexible film or a flexible sheet that comprises at least one stack of polypropylene ("PP") layers that may be co-extruded or laminated.

The polypropylene stack, whether rigid or flexible, can be coextruded with other film structures, or laminated with other film structures. It should be noted that in a laminated structure comprising such a polypropylene stack, the polypropylene stack may be co-extruded or laminated.

Lamination can be thermal lamination, extrusion lamination, adhesion lamination (solvent and solventless), or printing or forming or shaping, for example.

By a "layer comprising predominately a component" is meant that the layer predominately includes the component. To be clear, by "predominately" is meant that the layer comprises more than about 40% by weight of said component. For example, if a layer predominately comprises polypropylene, it means that the weight percent of PP in the layer is more than about 40%.

By a stack of polypropylene layers ("polypropylene stack" or "PP-stack") is meant at least two layers, each comprising predominately polypropylene, as described herein, and at least one other layer comprises predominately regular polypropylene.

In one embodiment, such a stack of polypropylene layers comprises at least two layers, each comprising predominately polypropylene, in which, at least one layer comprises predominately Impede® polypropylene as described herein, and at least one other layer comprises predominately regular polypropylene.

More specifically, in one embodiment, the present invention relates to a co-extruded multi-layer polymeric film, comprising at least one 2-layer stack A–B1 or A–B2, wherein the first layer of the 2-layer stack is A and the second layer of the 2-layer stack is either B1 or B2, wherein A is a layer comprising predominately polypropylene, B1 is a layer comprising predominately polypropylene and 50 wt. % or less of a hydrocarbon resin, and B2 is a layer comprising predominately IMPEDE® polymer; and wherein said two layers in said 2-layer stack are contactably adjacent each other.

In one embodiment, a polymeric film structure comprising only one 2-layer PP-stack does not include any other non-PP layer interspersed within the stack. So for example, in an A–B stack, there is no possibility that a third non-PP layer, for example C, is interspersed between A and B. But, in an A1–B–A2 stack, at least one pair, of A1–B and B–A2, does not have an additional layer C placed between them. In other words, in this embodiment, one or more A–B layers would not have an interspersed C layer. Similarly, in a stack of A1–B1–A2–B2–A3–A4, there is a possibility of a layer C not being interspersed between at least one pair of: A1 and B1, B1 and A2, A2 and B2, B2 and A3, or A3 and A4. Stated differently, in this stack, A1 is in planar contact with B1; B1 is in planar contact with A1 and A2; A2 is in a planar contact with B1 and B2, and so on and so forth. In this embodiment, A denotes polypropylene and B denotes Impede® polypropylene, or a layer comprising predominately polypropylene and 50 wt. % or less of a hydrocarbon resin, where A1, A2, etc. are different grades of polypropylene or blends of two or more grades of polypropylene; and B1, B2, etc. are different grades of Impede® polypropylene, or blends of two or more grades of Impede® or a layer comprising predominately polypropylene and 50 wt. % or less of a hydrocarbon resin or a mixture of its different grades or its mixture with Impede®.

In one embodiment, a PP-stack does not include any other non-PP layer interspersed within the stack. So for example, in an A–B stack, there is no possibility that a third non-PP layer, for example C, is interspersed between A and B. Similarly, in an A1–BA2 stack, there is no possibility of an additional layer C placed between A1 and B, or B and A2. Similarly, in a stack of A1–B1–A2–B2–A3–A4, there is no possibility of a layer C being interspersed between A1 and B1, B1 and A2, A2 and B2, B2 and A3, or A3 and A4. Stated differently, in this stack, A1 is in planar contact with B1; B1 is in planar contact with A1 and A2; A2 is in a planar contact with B1 and B2, and so on and so forth. In this embodiment, A denotes polypropylene and B denotes Impede® polypropylene, or a layer comprising predominately polypropylene and 50 wt. % or less of a hydrocarbon resin, where A1, A2, etc. are different grades of polypropylene or blends of two or more grades of polypropylene; and B1, B2, etc. are different grades of Impede® polypropylene, blends of two or more grades of Impede®, a layer comprising predominately polypropylene and 50 wt. % or less of a hydrocarbon resin, a mixture of its different grades, or its mixture with Impede®.

In one embodiment, the number of layers in a polypropylene stack ranges from 2-20. Stated another way, a PP-stack could have any one of the following number of layers: 2, 3, 4, 5, 6, 7, 8, 9, 10, 11, 12, 13, 14, 15, 16, 17, 18, 19, and 20. In one embodiment, the number of layers in the PP-stack is selected by any number within a range defined by any two numbers herein.

This invention also envisages rigid co-extruded film that includes one or more than one polypropylene stack.

In one embodiment, the rigid co-extruded film of the invention including at least one PP-stack further comprises other layers, such that the layers are co-extruded symmetrically or asymmetrically.

In one embodiment, the rigid co-extruded film of the invention including at least one PP-stack further comprises one or more of the following layers:
(1) at least one layer comprising predominately polypropylene;
(2) at least one layer comprising predominately IMPEDE® or a layer comprising predominately polypropylene and 50 wt. % or less of a hydrocarbon resin;
(3) at least one tie layer;
(4) at least one layer comprising predominately polyethylene polymer or interpolymer;
(5) at least one barrier layer comprising predominately EVOH;
(6) at least one barrier layer comprising predominately nylon;
(7) at least one barrier layer, comprising predominately polyester; and
(8) a combination of the above layers.

In one embodiment, the present invention relates to a polymeric film structure that includes a PP stack that acts as a barrier layer that includes a polymeric material comprising about 60 wt. % or less of at least one other polyolefin polymer and 50 wt. % or less of a hydrocarbon resin. The present inventors have discovered that such a polymeric film structure can exhibit an unexpected improvement in certain mechanical properties while also exhibiting suitable water vapor and oxygen transmission properties as well as a suitable transparency. Such unexpected combination of properties as described herein can enable the use of such polymeric film structures and resulting shaped polymeric articles for specific packaging applications, such as those requiring extended shelf life, high wall stiffness, and/or excellent clarity. Clearly, while the PP stack is necessarily included in the polymeric film structure of the present invention, one or more other barrier layers, for example an EVOH layer, are also envisioned within the scope of the present invention, as described infra.

II.A. Deflection Temperature Under Load

In one embodiment, the polymeric film structures and/or barrier layer and/or polymeric material as disclosed herein may demonstrate improved performance at higher temperatures. For instance, as indicated by the deflection temperature under load (DTUL), the temperature at which deformation occurs under a specified load may be relatively high. In this regard, the DTUL may be of 30° C. or more, such as 40° C. or more, such as 45° C. or more, such as 50° C. or more, such as 60° C. or more, such as 70° C. or more, such as 80° C. or more, such as 90° C. or more, such as 100° C. or more, such as 110° C. or more, such as 125° C. or more. The DTUL may be 130° C. or less, such as 120° C. or less, such as 110° C. or less, such as 100° C. or less, such as 90° C. or less, such as 80° C. or less, such as 75° C. or less. The aforementioned property may apply to the polymeric substrate, the barrier layer, and/or the polymeric material as disclosed herein.

The DTUL may be of a number below, or within a range formed by any two numbers below, including the endpoints of such a range, in units expressed as ° C.:
30, 35, 40, 45, 50, 55, 60, 65, 70, 75, 80, 85, 90, 95, 100, 105, 110, 115, 120, 125, and 130.

The aforementioned property may apply to the polymeric film structure, the barrier layer, and/or the polymeric material as disclosed herein.

II.B. Tensile Modulus

In one embodiment, the polymeric film structures and/or barrier layer and/or polymeric material as disclosed herein may also exhibit a relatively high tensile modulus, which is generally an indication of the stiffness. In this regard, the tensile modulus may be 500 MPa or more, such as 600 MPa or more, such as 700 MPa or more, such as 750 MPa or more, such as 800 MPa or more, such as 900 MPa or more, such as 1,000 MPa or more, such as 1,250 MPa or more, such as 1,500 MPa or more, such as 2,000 MPa or more, such as 2,250 MPa or more, such as 2,500 MPa or more, such as 2,750 MPa or more, such as 3,000 MPa or more, such as 3,250 MPa or more, such as 3,500 MPa or more, such as 4,000 MPa or more. The tensile modulus may be 5,000 MPa or less, such as 4,500 MPa or less, such as 4,000 MPa or less, such as 3,750 MPa or less, such as 3,500 MPa or less, such as 3,000 MPa or less, such as 2,500 MPa or less, such as 2,000 MPa or less, such as 1,500 MPa or less, such as 1,000 MPa or less. Furthermore, the tensile modulus may be a number below, or within a range formed by any two numbers below, including the endpoints of such a range, in units expressed as MPa:
500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 900, 1950, 2000, 2050, 2100, 2150, 2200, 2250, 2300, 2350, 2400, 2450, 2500, 2550, 2600, 2650, 2700, 2750, 2800, 2850, 2900, 2950, 3000, 3050, 3100, 3150, 3200, 3250, 3300, 3350, 3400, 3450, 3500, 3550, 3600, 3650, 3700, 3750, 3800, 3850, 3900, 3950, 4000, 4050, 4100, 4150, 4200, 4250, 4300, 4350, 4400, 4450, 4500, 4550, 4600, 4650, 4700, 4750, 4800, 4850, 4900, 4950, and 5000.

The aforementioned property may apply to the polymeric film structure, the barrier layer, and/or the polymeric material as disclosed herein.

II.C. Tensile Strength at Yield

In one embodiment, the polymeric film structures and/or barrier layer and/or polymeric material as disclosed herein may exhibit a relatively high tensile strength at yield. For instance, the tensile strength at yield may be 20 MPa or more, such as 25 MPa or more, such as 30 MPa or more, such as 35 MPa or more, such as 40 MPa or more, such as 45 MPa or more. The tensile strength at yield may be 200 MPa or less, such as 150 MPa or less, such as 100 MPa or less, such as 90 MPa or less, such as 80 MPa or less, such as 70 MPa or less, such as 60 MPa or less, such as 50 MPa or less, such as 45 MPa or less. the tensile strength at yield may be a number below, or within a range formed by any two numbers below, including the endpoints of such a range, in units expressed as MPa:
20, 30, 40, 50, 60, 70, 80, 90, 100, 110, 120, 130, 140, 150, 160, 170, 180, 190, and 200.

The aforementioned property may apply to the polymeric film structure, the barrier layer, and/or the polymeric material as disclosed herein.

II.D. Elongation at Yield

In one embodiment, the polymeric film structures and/or barrier layer and/or polymeric material as disclosed herein may exhibit a certain percent elongation at yield. For instance, the percent elongation at yield may be 10% or less, such as 8% or less, such as 6% or less, such as 5% or less, such as 4% or less, such as 3% or less, such as 2.5% or less, such as 2% or less, such as 1.5% or less. The percent elongation at yield may be 0.01% or more, such as 0.05% or more, such as 0.1% or more, such as 0.3% or more, such as 0.5% or more, such as 0.8% or more, such as 1% or more, such as 1.3% or more, such as 1.5% or more, such as 1.8% or more, such as 2% or more, such as 2.2% or more, such as 2.4% or more. The percent elongation at yield may also be a number below, or within a range formed by any two numbers below, including the endpoints of such a range, in the % units:

0.01, 0.03, 0.05, 0.07, 0.09, 0.1, 0.3. 0.5, 0.7, 0.9, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.2, 7.4, 7.6, 7.8, 8.0, 8.2, 8.4, 8.6, 8.8, 9.0, 9.2, 9.4, 9.6, 9.8, and 10.0.

The aforementioned property may apply to the polymeric film structure, the barrier layer, and/or the polymeric material as disclosed herein.

II.E. Flexural Properties

In addition to the tensile properties, the polymeric film structures and/or barrier layer and/or polymeric material as disclosed herein may also exhibit desired flexural properties. For instance, the flexural tangent modulus may be 500 MPa or more, such as 800 MPa or more, such as 1,000 MPa or more, such as 1,250 MPa or more, such as 1,500 MPa or more, such as 2,000 MPa or more, such as 2,250 MPa or more, such as 2,500 MPa or more, such as 2,750 MPa or more, such as 3,000 MPa or more, such as 3,250 MPa or more, such as 3,500 MPa or more, such as 4,000 MPa or more. The flexural tangent modulus may be 5,000 MPa or less, such as 4,500 MPa or less, such as 4,000 MPa or less, such as 3,750 MPa or less, such as 3,500 MPa or less, such as 3,000 MPa or less, such as 2,500 MPa or less, such as 2,000 MPa or less, such as 1,500 MPa or less, such as 1,000 MPa or less. The flexural tangent modulus may also be a number below, or within a range formed by any two numbers below, including the endpoints of such a range, in units expressed as MPa:

500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 900, 1950, 2000, 2050, 2100, 2150, 2200, 2250, 2300, 2350, 2400, 2450, 2500, 2550, 2600, 2650, 2700, 2750, 2800, 2850, 2900, 2950, 3000, 3050, 3100, 3150, 3200, 3250, 3300, 3350, 3400, 3450, 3500, 3550, 3600, 3650, 3700, 3750, 3800, 3850, 3900, 3950, 4000, 4050, 4100, 4150, 4200, 4250, 4300, 4350, 4400, 4450, 4500, 4550, 4600, 4650, 4700, 4750, 4800, 4850, 4900, 4950, and 5000.

The aforementioned property may apply to the polymeric film structure, the barrier layer, and/or the polymeric material as disclosed herein.

The polymeric film structures and/or barrier layer and/or polymeric material as disclosed herein may have a certain flexural secant modulus. The flexural secant modulus may be 500 MPa or more, such as 800 MPa or more, such as 1,000 MPa or more, such as 1,250 MPa or more, such as 1,500 MPa or more, such as 2,000 MPa or more, such as 2,250 MPa or more, such as 2,500 MPa or more, such as 2,750 MPa or more, such as 3,000 MPa or more, such as 3,250 MPa or more, such as 3,500 MPa or more, such as 4,000 MPa or more. The flexural secant modulus may be 5,000 MPa or less, such as 4,500 MPa or less, such as 4,000 MPa or less, such as 3,750 MPa or less, such as 3,500 MPa or less, such as 3,000 MPa or less, such as 2,500 MPa or less, such as 2,000 MPa or less, such as 1,500 MPa or less, such as 1,000 MPa or less. The flexural secant modulus may also be a number below, or within a range formed by any two numbers below, including the endpoints of such a range, in units expressed as MPa:

500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 900, 1950, 2000, 2050, 2100, 2150, 2200, 2250, 2300, 2350, 2400, 2450, 2500, 2550, 2600, 2650, 2700, 2750, 2800, 2850, 2900, 2950, 3000, 3050, 3100, 3150, 3200, 3250, 3300, 3350, 3400, 3450, 3500, 3550, 3600, 3650, 3700, 3750, 3800, 3850, 3900, 3950, 4000, 4050, 4100, 4150, 4200, 4250, 4300, 4350, 4400, 4450, 4500, 4550, 4600, 4650, 4700, 4750, 4800, 4850, 4900, 4950, and 5000.

The aforementioned property may apply to the polymeric film structure, the barrier layer, and/or the polymeric material as disclosed herein.

II.F. Impact Strength

The polymeric film structures and/or barrier layer and/or polymeric material as disclosed herein may exhibit a certain impact strength. For instance, the Notched Izod For instance, the Notched Izod impact strength may be 0.1 J/m or more, such as 0.5 J/m or more, such as 1 J/m or more, such as 2 J/m or more, such as 5 J/m or more, such as 8 J/m or more, such as 10 J/m or more. The Notched Izod impact strength may also be 50 J/m or less, such as 40 J/m or less, such as 30 J/m or less, such as 25 J/m or less, such as 20 J/m or less, such as 18 J/m or less, such as 15 J/m or less, such as 13 J/m or less, such as 10 J/m or less. The impact strength at 23° C. may also be a number below, or within a range formed by any two numbers below, including the endpoints of such a range, in units expressed as J/m:

0.1, 0.2, 0.5, 0.7, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50.

In addition, the Gardner impact strength may be 0.01 J or more, such as 0.1 J or more, such as 0.2 J or more, such as 0.3 J or more, such as 0.5 J or more, such as 0.7 J or more, such as 0.8 J or more, such as 1 J or more. The Gardner impact strength at 23° C. may also be a number below, or within a range formed by any two numbers below, including the endpoints of such a range, in units expressed as J/m:

0.01, 0.03, 0.05, 0.07, 0.09, 0.1, 0.3. 0.5, 0.7, 0.9, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.2, 7.4, 7.6, 7.8, 8.0, 8.2, 8.4, 8.6, 8.8, 9.0, 9.2, 9.4, 9.6, 9.8, and 10.0.

The aforementioned property may apply to the polymeric film structure, the barrier layer, and/or the polymeric material as disclosed herein.

II.G. Melt Flow Rate

The polymeric material as disclosed herein may have a certain melt flow rate. For instance, the melt flow rate may be 1 g/10 min or more, such as 2 g/10 min or more, such as 2.2 g/10 min or more, such as 2.5 g/10 min or more, such as 3 g/10 min or more, such as 3.5 g/10 min or more, such as 4 g/10 min or more, such as 4.5 g/10 min or more, such as 5 g/10 min or more, such as 10 g/10 min or more, such as 15 g/10 min or more, such as 20 g/10 min or more, such as 30 g/10 min or more. The melt flow rate may be 100 g/10 min or less, such as 80 g/10 min or less, such as 60 g/10 min or less, such as 50 g/10 min or less, such as 40 g/10 min or less, such as 30 g/10 min or less, such as 20 g/10 min or less, such as 15 g/10 min or less, such as 11 g/10 min or less, such as 10 g/10 min or less, such as 9 g/10 min or less, such as 8 g/10 min or less, such as 7.5 g/10 min or less, such as 7 g/10 min or less, such as 6.5 g/10 min or less, such as 6 g/10 min or less. The melt flow rate may be a number below, or within a range formed by any two numbers below, including the endpoints of such a range, in units expressed as g/10 min:

1, 1.2, 1.5, 2, 2.2, 2.5, 3, 3.2, 3.5, 4, 4.2, 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95, and 100.

II.H. Haze and Clarity

Also important for various applications are the optical properties, in particular the transparency and/or haze, of the polymeric film structure, the barrier layer, and/or the polymeric material. For instance, it may be desired to have a low haze. Even with certain additives and being relatively thicker, the percent haze may be 60 or less, such as 50 or less, such as 40 or less, such as 30 or less, such as 20 or less, such as 18 or less, such as 16 or less, such as 14 or less, such as 12 or less, such as 10 or less, such as 8 or less, such as 6 or less, such as 5 or less, such as 4 or less. The percent haze may be 0 or more, such as 1 or more, such as 2 or more, such as 3 or more, such as 4 or more, such as 5 or more, such as 10 or more, such as 25 or more. In addition, the percent clarity may be 90 or more, such as 95 or more, such as 96 or more, such as 97 or more, such as 98 or more, such as 99 or more.

Even with certain additives and being relatively thicker, the percent haze may be a number below, or within a range formed by any two numbers below, including the endpoints of such a range:

0, 1, 2, 3, 4, 5, 6, 7, 8, 9, 10, 11, 12, 13, 14, 15, 16, 17, 18, 19, 20, 21, 22, 23 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, and 60.

In addition, the percent clarity may be a number below, or within a range formed by any two numbers below, including the endpoints of such a range:

90, 91, 92, 93, 94, 95, 96, 97, 98, 99, and 100.

The aforementioned properties may apply to the polymeric film structure, the barrier layer, and/or the polymeric material as disclosed herein. In addition, such property may be realized at a single thickness value or within a range of thicknesses as disclosed herein. For instance, the percent haze or clarity may be for the polymeric material when formed at a particular thickness (e.g., 25 mils and/or 50 mils). The percent haze and clarity may be determined in accordance with ASTM D1003.

II.I. Transmission Properties

In addition to the desirable mechanical properties and optical properties, the polymeric film structures and/or barrier layer and/or polymeric material as disclosed herein may, also exhibit relatively low transmission properties. Such transmission properties may allow for the polymeric film structure and/or barrier layer and/or polymeric material to be utilized for various packaging applications. In this regard, the polymeric film structure and/or barrier layer and/or polymeric material may exhibit a relatively low water vapor transmission rate and/or oxygen transmission rate. For instance, the water vapor transmission rate may be 5 cm3/m2/day or less, such as 4 cm3/m2/day or less, such as 3 cm3/m2/day or less, such as 2 cm3/m2/day or less, such as 1 cm3/m2/day or less, such as 0.5 cm3/m2/day or less, such as 0.1 cm3/m2/day or less, such as 0.08 cm3/m2/day or less, such as 0.06 cm3/m2/day or less, such as 0.05 cm3/m2/day or less, such as 0.03 cm3/m2/day or less, such as 0.01 cm3/m2/day or less, such as 0.005 cm3/m2/day or less, such as 0.001 cm3/m2/day or less. The water vapor transmission rate may be more than 0 cm3/m2/day, such as 0.001 cm3/m2/day or more, such as 0.005 cm3/m2/day or more, such as 0.01 cm3/m2/day or more, such as 0.05 cm3/m2/day or more, such as 0.1 cm3/m2/day or more. The water vapor transmission rate may also be a number below, or within a range formed by any two numbers below, including the endpoints of such a range in the units cm3/m2/day:

0, 0.0005, 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, and 5.

Also, the oxygen transmission rate may be 60 cm3/100 in2/day or less, such as 50 cm3/100 in2/day or less, such as 40 cm3/100 in2/day or less, such as 30 cm3/100 in2/day or less, such as 25 cm3/100 in2/day or less, such as 20 cm3/100 in2/day or less, such as 15 cm3/100 in2/day or less, such as 10 cm3/100 in2/day or less, such as 5 cm3/100 in2/day or less, such as 4 cm3/100 in2/day or less, such as 3 cm3/100 in2/day or less, such as 2.5 cm3/100 in2/day or less. The oxygen transmission rate may be more than 0 cm3/100 in2/day, such as 0.5 cm3/100 in2/day or more, such as 1 cm3/100 in2/day or more, such as 3 cm3/100 in2/day or more, such as 5 cm3/100 in2/day or more, such as 8 cm3/100 in2/day or more, such as 10 cm3/100 in2/day or more. The oxygen transmission rate may be for the polymeric material when formed at a particular thickness (e.g., 8 mils, 10 mils, and/or 18 mils). Also, the oxygen transmission rate may be a number below, or within a range formed by any two numbers below, including the endpoints of such a range in the units of cm3/100 in2/day:

0, 0.1, 0.2, 0.3, 0.4, 0.5, 1, 1.5, 2, 2.5, 3, 3.5, 4, 4.5, 5, 10, 15, 20, 25, 30, 35, 40, 45, 50, 55, and 60.

The oxygen transmission rate may be for the polymeric material when formed at a particular thickness (e.g., 8 mils, 10 mils, and/or 18 mils).

II.J. Thickness of the Polymeric Film Structure

For instance, the polymeric film structure may have a thickness of more than 200 μm, such as 210 μm or more, such as 220 μm or more, such as 240 μm or more, such as 250 μm or more, such as 300 μm or more, such as 350 μm or more, such as 400 μm or more, such as 500 μm or more, such as 700 μm or more, such as 900 μm or more, such as 1 mm or more, such as 2 mm or more, such as 3 mm or more, such as 5 mm or more. The polymeric film structure may have a thickness of 1.25 cm or less, such as 1 cm or less, such as 8 mm or less, such as 5 mm or less, such as 3 mm or less, such as 2 mm or less, such as 1.5 mm or less, such as 1.3 mm or less, such as 1 mm or less, such as 900 μm or less, such as 800 μm or less, such as 700 μm or less, such as 600 μm or less, such as 500 μm or less, such as 400 μm or less, such as 350 μm or less, such as 300 μm or less, such as 280 μm or less, such as 270 μm or less.

Stated another way, the polymeric film structure thickness may be any number below, or within a range defined by any two numbers below, including the endpoints of such a range, in the μm units:

5, 10, 20, 30, 50, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1100, 1125, 1150, 1175, 1200, 1225, 1250, 1275, 1300, 1325, 1350, 1375, 1400, 1425, 1450, 1475, 1500, 1525, 1600, 1700, 1800, 1900, 2000, 2500, 3000, 3500, 4000, 4500, 5000, 6000, 7000, 8000, 9000, 10000, 11000, 12000 and 13000.

The aforementioned property may apply to the barrier layer. In addition, when the polymeric film structure is a monolayer polymeric film structure that simply includes the barrier layer as defined herein, the aforementioned thicknesses may also apply to the barrier layer.

In one embodiment, this invention also relates to laminated structures that are prepared from the above polymeric film structures. For example, in one embodiment, this invention relates to laminated structures that include the coextruded structures described herein comprising at least one polypropylene stack. Such laminations include extrusion lamination, and/or thermal lamination, and/or adhesion lamination (solvent and solventless). In other words, the polypropylene-stack is co-extruded, but the laminated structure that comprises the PP-stack may have some or all of the other layers (the non-PP-stack layers) co-extruded, and/or some or all of the other layers thermally laminated, and/or some or all of the other layers adhesion laminated (solvent and solventless), and/or all of the other layers prepared in a different manner such as printing, forming/shaping. A thicker laminate structure can be constructed from such lamination. The thickness of the laminated structure may be any number below, or within a range defined by any two numbers below, including the end-points of such a range, in the μm units:

5, 10, 20, 30, 50, 50, 75, 100, 125, 150, 175, 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1100, 1125, 1150, 1175, 1200, 1225, 1250, 1275, 1300, 1325, 1350, 1375, 1400, 1425, 1450, 1475, 1500, 1525, 1600, 1700, 1800, 1900, 2000, 2500, 3000, 3500, 4000, 4500, 5000, 6000, 7000, 8000, 9000, 10000, 11000, 12000 and 13000.

In one embodiment, such a laminated structure is a rigid sheet in the thickness range of 10 μm to 1525 μm (0.5 mil to 60 mil).

This invention also includes making polymeric film structures using other forming techniques, besides lamination, such as printing, forming, and shaping.

This invention also envisions polymeric film structures as disclosed above, wherein the film structure is flexible, semi-rigid, or rigid. As envisioned within the scope of this invention, the rigidity generally is correlated to thickness of the polymeric film structure, but not necessarily.

In one embodiment, in a layer comprising predominately polypropylene, other components in the layer include polyolefins, a hydrocarbon resin, and optionally, additives. The polypropylene, polyolefins, hydrocarbon, and other materials are described herein. The layers outside of the PP stack or stacks of the polymeric film structure herein comprise other materials described herein, and in the art. The other layers are not predominately PP.

III. Materials for the Polymeric Film Structure

III. A. Polypropylene

The generic material properties of PP are listed below:

| | |
|---|---|
| Density | 0.88-0.93 g/cm$^3$ |
| Melt Index | 0.30 to 10 g/10 min |
| Brittleness Temperature | <−20° C. |
| Maximum Continued Use Temperature: | 82° C. (180° F.) |
| Heat Deflection Temperature: | 115° C. (240° F.) |

In this invention, polypropylene (PP), in a co-extruded layer in the PP-stack or otherwise in the film, is homopolymer polypropylene, homogeneous copolymer of polypropylene, heterogeneous copolymer of polypropylene, a blend of polypropylene copolymer and polypropylene homopolymer. The PP content is in the range of from about 40 to about 100 parts by weight of a polypropylene layer in the PP-stack or otherwise, in the rigid film. Stated differently, in a polypropylene layer, the PP content is any one of the following numbers by percent weight of the polypropylene layer:

40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100.

The PP content can also be in a range defined by any two numbers above, including the end-points of the range.

In one embodiment, to prepare a high impact strength version of the film the grade of polypropylene or blend of polypropylene(s) used is such that the Izod impact strength of the PP is greater than 9 ft-lb$_f$ per inch of notch according to American Society for Testing and Materials (ASTM) standard D256.

More preferably, a particularly suitable polypropylene may be a blown-film grade, high impact copolymer with an Izod impact strength (ASTM D 257, at 23° C.) of from 8 to 80 ft-lb$_f$ per inch of notch, and melt flow index (ASTM D 1238, 2.16 kg, 23° C.) of from about 0.3 to about 5.5 dg/min (or g/10 min). The Izod impact strength range can also be defined by any two numbers from 8, 9, 10, . . . , 78, 79, and 80 ft-lb$_f$ per inch of notch. Similarly, the melt-flow index range can also be defined by any two numbers from about 0.3, about 0.35, about 0.4, about 0.45, . . . , about 5.40, about 5.45, and about 5.50 dg/min. In a preferred embodiment, said at least one polypropylene has a melt-index in the range of from about 0.45 to about 0.75 dg/min.

Polypropylene used in the present invention is also polymerized using Zeigler-Natta, or single-site catalysts, or combinations of these catalysts.

Isotactic polypropylene homopolymer ("holm PP") is a homogeneous polymer normally polymerized in a single stage reaction, with a single clean DSC melting peak in the region 160-165° C.

Homogeneous polypropylene also consists of a single phase, and has a single clean DSC melting peak, which occurs at a lower temperature than that of the homopolymer. The energy of melting of the homogeneous interpolymer is also somewhat lower than that of the homopolymer.

Heterogeneous polypropylene is formed in a two stage reaction. In the first stage, a crystalline network of isotactic polypropylene homopolymer or homogeneous polypropylene is formed. In the second stage, a largely amorphous rubbery phase is formed within the crystalline network. A portion of the polymer formed in the second stage reaction is normally rich enough in comonomer, to be able to crystallize to form a third phase. When the comonomer is ethylene, the third phase normally has a DSC melting peak in the 120-125° C. region.

III.B. IMPEDE® Polypropylene

By IMPEDE® polypropylene is meant a polypropylene homopolymer with the following properties. It is procured from Flint Hills Resources, at 8128 Up River Road, Corpus Christi, TX 78410. It is clarified with Impede enhancement technology providing higher stiffness, improved barrier (O2 and H2O) and high clarity.

TABLE 1

MP1250-TC PP

| | Typical Value (SI) | ASTM Test Method |
|---|---|---|
| Resin Properties | | |
| Melt Flow Rate | 5.5 g/10 min | D 1238 |
| Density | 0.90 g/cm$^3$ | D1505 |
| Melting Temperature Range | 160-165° C. | D3418 |
| Mechanical Properties | | |
| Tensile Yield Strength | 30.3 MPa | D638 |
| Tensile Yield Elongation | 4.0% | D638 |
| Flexural Modulus 1% Secant | 2960 MPa | D790 |
| Flexural Modulus Tangent | 3050 MPa | D790 |
| Deflection Temperature (66 psi (0.455 MPa) | 80° C. | D648 |
| Rockwell Hardness | 110R (English units) | |
| Notched Izod @ 23° C. | 14 J/m | D256 |
| ASTM Haze 0.050" | 40.3% | D1003 |
| ASTM Haze 0.025" | 19.9% | D1003 |

TABLE 2

MP2250-TC PP

| | Typical Value (SI) | ASTM Test Method |
|---|---|---|
| Resin Properties | | |
| Melt Flow Rate | 4.5 g/10 min | D 1238 |
| Density | 0.90 g/cm$^3$ | D1505 |
| Melting Temperature Range | 145-150° C. | D3418 |
| Mechanical Properties | | |
| Tensile Yield Strength | 32.7 MPa | D638 |
| Tensile Yield Elongation | 3.5% | D638 |
| Flexural Modulus 1% Secant | 1570 MPa | D790 |
| Flexural Modulus Tangent | 1690 MPa | D790 |
| Deflection Temperature (66 psi (0.455 MPa) | 52° C. | D648 |
| Rockwell Hardness | 110R (English units) | |
| Notched Izod @ 23° C. | 18 J/m | D256 |
| ASTM Haze 0.050" | 425% | D1003 |
| ASTM Haze 0.025" | 8% | D1003 |

III.C. Polyolefin

The polymeric film structure of the present invention may include one or more layers comprising at least one polyolefin. Even the PP stack layer—that comprises predominately polypropylene—may further comprise at least one other polyolefin.

The polyolefin polymer may be one formed from an olefin monomer, such as an α-olefin monomer. In this regard, the monomer may be ethylene such that the polyolefin polymer includes an ethylene polymer. In addition, the monomer may be propylene such that the polyolefin polymer includes a propylene polymer. In one particular embodiment, the polyolefin polymer comprises a propylene polymer.

In general, the polyolefin polymer may be a homopolymer or a copolymer. In one embodiment, the polyolefin polymer comprises a homopolymer. For example, when the polyolefin polymer comprises a propylene polymer, such polymer may be a propylene homopolymer. In another embodiment, the polyolefin polymer comprises a copolymer. For example, when the polyolefin polymer comprises a propylene polymer, such polymer may be a propylene copolymer. Accordingly, in one embodiment, the propylene polymer may be a propylene homopolymer. In another embodiment, the propylene polymer may be a propylene copolymer. In particular, the propylene copolymer may be a propylene elastomer.

Similarly, when the polyolefin polymer comprises a homopolymer and the polyolefin polymer comprises an ethylene polymer, such polymer may be an ethylene homopolymer. In another embodiment, when the polyolefin polymer comprises a copolymer and the polyolefin polymer comprises an ethylene polymer, such polymer may be an ethylene copolymer. Accordingly, in one embodiment, the ethylene polymer may be an ethylene homopolymer. In another embodiment, the ethylene polymer may be an ethylene copolymer. In particular, the ethylene copolymer may be an ethylene elastomer.

When present as a copolymer, the copolymer may include at least one comonomer including at least one α-olefin (i.e., one other than ethylene if an ethylene copolymer or propylene if a propylene copolymer). In this regard, the comonomer may include ethylene (if a propylene copolymer), propylene (if an ethylene copolymer), a $C_4$-$C_{20}$ α-olefin, or a combination thereof. For example, when the comonomer includes a $C_4$-$C_{20}$ α-olefin, the comonomer may in a particular embodiment be a $C_4$-$C_{12}$ α-olefin, such as a $C_4$-$C_{10}$ α-olefin, such as a $C_4$-$C_8$ α-olefin. Regardless, specific examples of α-olefins include, but are not limited to, ethylene, butene (e.g., 1-butene, 3-methyl-1-butene, 3,3-dimethyl-1-butene), pentene (e.g., 4-methyl-1-pentene, 3-methyl-1-pentene), hexene (e.g., 1-hexene, 3,5,5-trimethyl-1-hexene), heptene, octene (e.g., 1-octene, 2-octene), nonene (e.g., 5-methyl-1-nonene), decene, dodecene, and styrene.

In a particular embodiment, the comonomer may include at least one of ethylene (if a propylene copolymer), propylene (if an ethylene copolymer), 1-butene, 1-hexene, or 1-octene. For instance, in one embodiment, the comonomer may include at least ethylene (if a propylene copolymer) or propylene (if an ethylene copolymer). In another embodiment, the comonomers may include at least ethylene and at least one of 1-butene, 1-hexene, or 1-octene.

In addition, it should be understood that suitable α-olefins may be linear or branched (e.g., one or more $C_1$-$C_3$ alkyl branches or an aryl group). For example, in one embodiment, the α-olefin may be linear. In another embodiment, the α-olefin may be branched. In this regard, the α-olefin may be substituted, such as with one or more methyl, dimethyl, trimethyl, ethyl or propyl substituents. However, it should be understood that the α-olefin may also be unsubstituted.

In addition to the above mentioned α-olefin comonomers, the copolymer may optionally include other comonomers. For instance, these comonomers may include aromatic group containing comonomers, non-aromatic cyclic group containing comonomers, and/or diolefin comonomers. For example, these comonomers may contain 4 or more, such as 5 or more, such as 8 or more, such as 10 or more, such as 15 or more carbon atoms to 30 or less, such as 25 or less, such as 20 or less, such as 15 or less, such as 10 or less carbon atoms.

In one embodiment, the comonomer may include a diene. The diene may be a straight chain acyclic olefin, a branched chain acyclic olefin, a single ring alicyclic olefin, a multi-ring alicyclic fused or bridged ring olefin, a cycloalkenyl-substituted alkene, or a mixture thereof. The diene, may include, but is not limited to, butadiene, pentadiene, hexadiene (e.g., 1,4-hexadiene, 5-methyl-1,4-hexadiene, 1,4-cyclohexadiene), heptadiene (e.g., 1,6-heptadiene), octadiene (e.g., 1,6-octadiene, 1,7-octadiene, 3,7-dimethyl-1,6-octadiene, 3,7-dimethyl-1,7-octadiene, 1,5-cyclooctadiene), nonadiene (e.g., 1,8-nonadiene), decadiene (e.g., 1,9-decadiene), undecadiene (e.g., 1,10-undecadiene), dodecadiene (e.g., 1,11-dodecadiene, 1,7-cyclododecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, tetrahydroindene, norbornadiene, methyl-tetrahydroindene, dicyclopentadiene, bicyclo-(2.2.1)-hepta-2,5-diene, alkenyl norbornenes, alkylidene norbornenes (e.g., ethylidiene norbornene), cycloalkenyl norbornenes, cycloalkylene norbornenes (e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene), vinyl cyclohexene, allyl cyclohexene, vinyl cyclooctene, 4-vinyl cyclohexene, allyl cyclodecene, vinyl cyclododecene, and tetracyclo (A-11, 12)-5,8-dodecene.

The diene may also include a polybutadiene, such as a low molecular weight butadiene. For example, the polybutadiene may have a weight average molecular weight of about 2,000 g/mol or less, such as about 1,500 g/mol or less, such as about 1,000 g/mol or less. The diene may include a cyclic diene, such as cyclopentadiene, vinyl norbornene, norbornadiene, ethylidene norbornene, divinylbenzene, dicyclopentadiene or higher ring containing diolefins with or without substituents at various ring positions.

Regardless of the type of comonomer(s) utilized, the primary monomer (i.e., ethylene or propylene) may constitute about 50 mole % or more, such as about 60 mole % or more, such as about 65 mole % or more, such as about 70 mole % or more, such as about 75 mole % or more, such as about 80 mole % or more, such as about 85 mole % or more, such as about 90 mole % or more, such as about 93 mole % or more of the copolymer. The primary monomer (i.e., ethylene or propylene) may constitute less than 100 mole %, such as about 99.5 mole % or less, such as about 99 mole % or less, such as about 98 mole % or less, such as about 97 mole % or less, such as about 95 mole % or less of the copolymer. Accordingly, the primary monomer (i.e., ethylene or propylene) may constitute about 50 wt. % or more, such as about 60 wt. % or more, such as about 65 wt. % or more, such as about 70 wt. % or more, such as about 75 wt. % or more, such as about 80 wt. % or more, such as about 85 wt. % or more, such as about 90 wt. % or more, such as about 93 wt. % or more of the copolymer. The primary monomer (i.e., ethylene or propylene) may constitute less than 100 wt. %, such as about 99.5 wt. % or less, such as about 99 wt. % or less, such as about 98 wt. % or less, such as about 97 wt. % or less, such as about 95 wt. % or less of the copolymer.

Likewise, the comonomers, such as the α-olefin, may constitute about 0.1 mole % or more, such as about 0.3 mole % or more, such as about 0.5 mole % or more, such as about 1 mole % or more, such as about 2 mole % or more, such as about 3 mole % or more, such as about 5 mole % or more of the copolymer. The comonomers may constitute less than 50 mole %, such as about 40 mole % or less, such as about 35 mole % or less, such as about 30 mole % or less, such as about 20 mole % or less, such as about 15 mole % or less, such as about 10 mole % or less, such as about 7 mole % or less of the copolymer. Accordingly, the comonomers may constitute about 0.1 wt. % or more, such as about 0.3 wt. % or more, such as about 0.5 wt. % or more, such as about 1 wt. % or more, such as about 2 wt. % or more, such as about 3 wt. % or more, such as about 5 wt. % or more of the copolymer. The comonomers may constitute less than 50 wt. %, such as about 40 wt. % or less, such as about 30 wt. % or less, such as about 25 wt. % or less, such as about 20 wt. % or less, such as about 15 wt. % or less, such as about 10 wt. % or less, such as about 8 wt. % or less, such as about 7 wt. % or less of the copolymer. It should be understood that the aforementioned percentages may apply to all of the comonomers in combination or a single type of comonomer utilized in the copolymer.

In embodiments where a third comonomer (e.g., one not including ethylene) is present, such third comonomer may be present in an amount of about 10 wt. % or less, such as about 5 wt. % or less, such as about 4 wt. % or less, such as about 3 wt. % or less, such as about 2 wt. % or less based on the weight of the copolymer.

In one particular embodiment, the polyolefin polymer may be a polyolefin copolymer elastomer. For instance, the propylene copolymer may be a propylene copolymer elastomer. As generally understood in the art, the elastomer may satisfy the properties of ASTM D1566-19. In one embodiment, the elastomer may include ethylene and at least one comonomer of propylene, butene, hexene, and octene. In another embodiment, the elastomer may include propylene and at least one comonomer of ethylene, butene, hexene, and octene. In one particular embodiment, the elastomer includes propylene and ethylene. For instance, the elastomer may not include any further comonomers. However, in one embodiment, the elastomer may comprise propylene, ethylene, and at least one of butene, hexene, and octene. For instance, the elastomer may include propylene-ethylene-butene, propylene-ethylene-hexene, propylene-ethylene-octene, or a mixture thereof. In this regard, in one embodiment, the elastomer may include propylene-ethylene-butene. In another embodiment, the elastomer may include propylene-ethylene-hexene. In a further embodiment, the elastomer may include propylene-ethylene-octene.

In general, the polyolefin copolymer may have any monomer arrangement. For instance, the polyolefin copolymer may be a random copolymer. Alternatively, in another embodiment, the polyolefin copolymer may be a block copolymer. In a further embodiment, the polyolefin copolymer may be a heterophasic copolymer.

The polyolefin polymer may have a certain molecular structure that may allow for it to be utilized for a specification application. In this regard, the polyolefin polymer may have a certain degree of tacticity. For instance, in one embodiment, the polyolefin polymer may be an isotactic polyolefin polymer. In particular, the polyolefin homopolymer may be an isotactic polyolefin homopolymer. In this regard, the polyolefin polymer may have at least 50%, such as at least 60%, such as at least 70%, such as at least 80%, such as at least 85%, such as at least 90% isotacticity as determined according to analysis by .sup.13C-NMR.

However, it should be understood that the polyolefin polymer may alternatively have an atactic or syndiotactic molecular structure. For instance, in one embodiment, the polyolefin polymer may be an atactic polyolefin polymer. In another embodiment, the polyolefin polymer may be a syndiotactic polyolefin polymer. For example, the polyolefin polymer may have at least 50%, such as at least 60%, such as at least 70%, such as at least 80%, such as at least 85%, such as at least 90% syndiotacticity as determined according to analysis by .sup.13C-NMR.

In general, a polyolefin homopolymer may have a greater isotacticity or syndiotacticity and a generally lower atacticity. For example, a syndiotactic polyolefin homopolymer may have a syndiotacticity of at least 80%, such as at least 85%, such as at least 90%. Similarly, an isotactic polyolefin homopolymer may have an isotacticity of at least 80%, such as at least 85%, such as at least 90%. Accordingly, such polyolefin homopolymer may have an atacticity of less than 20%, such as less than 15%, such as less than 10%, such as less than 5%.

In this regard, the polyolefin polymer may have a certain crystallinity. For instance, the crystallinity may be at least about 1%, such as at least about 2%, such as at least about 5%, such as at least about 10%, such as at least about 15%, such as at least about 20%, such as at least about 25%, such as at least about 30%, such as at least about 40%, such as at least about 50%, such as at least about 60%, such as at least about 70%, such as at least about 80%, such as at least about 90%, such as at least about 95%, such as at least about 98%, such as at least about 99%. The crystallinity is generally less than 100%. For instance, the crystallinity may be less than 100%, such as about 99% or less, such as about 98% or less, such as about 95% or less, such as about 90% or less, such as about 80% or less, such as about 70% or less, such as about 60% or less, such as about 50% or less, such as about 40% or less, such as about 30% or less, such as about 20% or less. For instance, a polyolefin homopolymer may generally have a higher crystallinity than a polyolefin copolymer elastomer.

The crystallinity may be determined based on a xylene soluble content. For example, a higher crystallinity will result in a lower xylene soluble content. In this regard, the xylene soluble weight percentage may be 50% or less, such as 40% or less, such as 30% or less, such as 20% or less, such as 15% or less, such as 10% or less, such as 5% or less, such as 4% or less, such as 3% or less, such as 2% or less, such as 1% or less. Without intending to be limited, the xylene soluble content provides a measure of the amorphous portion of the polyolefin polymer. The xylene soluble content can be determined in accordance with ASTM D5492-17.

In general, the crystallinity of the polyolefin polymer can have an impact on the melting temperature as well as the crystallization temperature of the polymer. In this regard, the melting temperature and the crystallization temperature of the polyolefin polymer may be relatively low. For instance, the melting temperature may be about 70° C. or more, such as about 85° C. or more, such as about 100° C. or more, such as about 110° C. or more, such as about 120° C. or more, such as about 130° C. or more, such as about 140° C. or more, such as about 150° C. or more, such as about 160° C. or more, such as about 165° C. or more. The melting temperature may be about 170° C. or less, such as about 160° C. or less, such as about 150° C. or less, such as about 125° C. or less, such as about 115° C. or less, such as about 100° C. or less. For instance, a polyolefin homopolymer may generally have a higher melting temperature than a polyolefin copolymer elastomer.

The crystallization temperature of the polyolefin polymer may be about 70° C. or more, such as about 80° C. or more, such as about 90° C. or more, such as about 95° C. or more, such as about 100° C. or more, such as about 105° C. or more, such as about 110° C. or more, such as about 115° C. or more, such as about 120° C. or more, such as about 125° C. or more. The crystallization temperature may be about 140° C. or less, such as about 130° C. or less, such as about 120° C. or less, such as about 110° C. or less, such as about 100° C. or less.

The glass transition temperature of the polyolefin polymer may be about 125° C. or less, such as about 115° C. or less, such as about 105° C. or less, such as about 100° C. or less, such as about 90° C. or less, such as about 80° C. or less, such as about 70° C. or less, such as about 50° C. or less, such as about 40° C. or less, such as about 30° C. or less, such as about 20° C. or less, such as about 10° C. or less, such as about 0° C. or less. The glass transition temperature may be about −50° C. or more, such as about −40° C. or more, such as about −30° C. or more, such as about −20° C. or more, such as about −10° C. or more, such as about 0° C. or more, such as about 20° C. or more, such as about 40° C. or more, such as about 50° C. or more.

The polyolefin polymer may also have certain properties that may allow for it to be utilized for a specific application. In this regard, the polyolefin polymer may have a particular weight average molecular weight (Mw). For instance, the Mw may be about 2,500 g/mol or more, such as about 5,000 g/mol or more, such as about 8,000 g/mol or more, such as about 10,000 g/mol or more, such as about 12,000 g/mol or more, such as about 20,000 g/mol or more, such as about 25,000 g/mol or more, such as about 50,000 g/mol or more, such as about 80,000 g/mol or more, such as about 90,000 g/mol or more, such as about 100,000 g/mol or more, such as about 200,000 g/mol or more, such as about 300,000 g/mol or more. The Mw may be about 1,000,000 g/mol or less, such as about 800,000 g/mol or less, such as about 600,000 g/mol or less, such as about 500,000 g/mol or less, such as about 400,000 g/mol or less, such as about 300,000 g/mol or less, such as about 250,000 g/mol or less, such as about 200,000 g/mol or less, such as about 150,000 g/mol or less, such as about 100,000 g/mol or less, such as about 50,000 g/mol or less. The Mw may be determined using techniques known in the art, such as gel permeation chromatography.

Similarly, the polyolefin polymer may also have a particular number average molecular weight (Mn). For instance, the Mn may be about 2,500 g/mol or more, such as about 5,000 g/mol or more, such as about 8,000 g/mol or more, such as about 10,000 g/mol or more, such as about 12,000 g/mol or more, such as about 20,000 g/mol or more, such as about 25,000 g/mol or more, such as about 50,000 g/mol or more, such as about 80,000 g/mol or more, such as about 90,000 g/mol or more, such as about 100,000 g/mol or more, such as about 200,000 g/mol or more, such as about 300,000 g/mol or more. The Mn may be about 1,000,000 g/mol or less, such as about 800,000 g/mol or less, such as about 600,000 g/mol or less, such as about 500,000 g/mol or less, such as about 400,000 g/mol or less, such as about 300,000 g/mol or less, such as about 250,000 g/mol or less, such as about 200,000 g/mol or less, such as about 150,000 g/mol or less, such as about 100,000 g/mol or less, such as about 50,000 g/mol or less. The Mn may be determined using techniques known in the art, such as gel permeation chromatography.

In this regard, the polyolefin polymer may have a particular polydispersity index (Mw/Mn). For instance, the polydispersity index may be more than 1, such as about 2 or more, such as about 2.3 or more, such as about 2.5 or more, such as about 3 or more, such as about 3.5 or more, such as about 4 or more. The polydispersity index may be about 9 or less, such as about 8 or less, such as about 7 or less, such as about 5 or less, such as about 4.5 or less, such as about 4 or less, such as about 3.5 or less, such as about 3 or less, such as about 2.5 or less.

The polyolefin polymer may have a particular specific gravity. For instance, the specific gravity may be about 0.8 g/cm$^3$ or more, such as about 0.83 g/cm$^3$ or more, such as about 0.85 g/cm$^3$ or more, such as about 0.86 g/cm$^3$ or more, such as about 0.87 g/cm³ or more, such as about 0.88 g/cm³ or more, such as about 0.9 g/cm³ or more. The specific gravity may be less than 1 g/cm³, such as about 0.95 g/cm³ or less, such as about 0.93 g/cm³ or less, such as about 0.92 g/cm³ or less, such as about 0.91 g/cm³ or less, such as about 0.9 g/cm³ or less, such as about 0.89 g/cm³ or less, such as about 0.88 g/cm³ or less. The specific gravity may be determined according to ASTM D792-20.

The polyolefin polymer may have a particular melt flow rate. For instance, the melt flow rate may be about 0.1 g/10 min or more, such as about 0.2 g/10 min or more, such as about 0.3 g/10 min or more, such as about 0.4 g/10 or more, such as about 0.5 g/10 min or more, such as about 1 g/10 min or more, such as about 1.5 g/10 min or more, such as about 2 g/10 min or more, such as about 5 g/10 min or more, such as about 10 g/10 min or more, such as about 20 g/10 min or more, such as about 25 g/10 min or more. The melt flow rate may be about 500 g/10 min or less, such as about 200 g/10 min or less, such as about 100 g/10 min or less, such as about 50 g/10 min or less, such as about 40 g/10 min or less, such as about 20 g/10 min or less, such as about 10 g/10 min or less, such as about 5 g/10 min or less, such as about 4 g/10 min or less, such as about 3 g/10 min or less, such as about 2 g/10 min or less, such as about 1.5 g/10 min or less, such as about 1 g/10 min or less, such as about 0.8 g/10 min or less, such as about 0.6 g/10 min or less, such as about 0.5 g/10 min or less, such as about 0.45 g/10 min or less, such as about 0.4 g/10 min or less, such as about 0.35 g/10 min or less, such as about 0.3 g/10 min or less. The melt flow rate may be determined according to ASTM D1238-13 when subjected to a load of 2.16 kg in 10 minutes at a temperature of 230° C.

The polyolefin polymer may also have a particular heat of fusion. For instance, the heat of fusion may be about 40 J/g or more, such as about 50 J/g or more, such as about 60 J/g or more, such as about 70 J/g or more, such as about 75 J/g or more, such as about 80 J/g or more, such as about 90 J/g or more, such as about 100 J/g or more, such as about 125 J/g or more, such as about 150 J/g or more, such as about 200 J/g or more. The heat of fusion may be about 300 J/g or less, such as about 250 J/g or less, such as about 200 J/g or less, such as about 150 J/g or less, such as about 125 J/g or less, such as about 100 J/g or less, such as about 80 J/g or less, such as about 75 J/g or less, such as about 70 J/g or less, such as about 65 J/g or less, such as about 60 J/g or less, such as about 50 J/g or less. For instance, a polyolefin homopolymer may have a relatively higher heat of fusion while a polyolefin copolymer elastomer may have a relatively lower heat of fusion.

The polyolefin polymer may also have a particular crystallinity. For instance, the crystallinity may be 50% or more, such as 60% or more, such as 70% or more, such as 80% or more, such as 90% or more. In general, the percentage is used to define the weight of crystallized area per polymer total weight and can be determined using means in the art, such as a differential scanning calorimeter, an x-ray diffractometer (XRD), etc. In addition, the polyolefin polymer may have an isotacticity of 95% or more, such as 96% or more, such as 97% or more. Further, the polyolefin polymer may have an atactic fraction of 5% or less, such as 4% or less, such as 3% or less.

The polyolefin polymer may also have a particular flexural modulus. For instance, the flexural modulus in the machine direction may be about 50 MPa or more, such as about 100 MPa or more, such as about 200 MPa or more, such as about 300 MPa or more, such as about 400 MPa or more, such as about 500 MPa or more, such as about 1,000 MPa or more, such as about 1,300 MPa or more, such as about 1,500 MPa or more, such as about 2,000 MPa or more. The flexural modulus in the machine direction may be about 4,000 MPa or less, such as about 3,000 MPa or less, such as about 2,500 MPa or less, such as about 2,300 MPa or less, such as about 2,100 MPa or less, such as about 2,000 MPa or less, such as about 1,900 MPa or less, such as about 1,800 MPa or less, such as about 1,500 MPa or less, such as about 1,300 MPa or less, such as about 1,000 MPa or less, such as about 800 MPa or less. The flexural modulus may be determined according to ASTM D790-17 and 1.3 mm/min.

The polyolefin polymer may also have a particular deflection temperature under load (DTUL). For instance, the DTUL may be about 40° C. or more, such as about 45° C. or more, such as about 50° C. or more, such as about 60° C. or more, such as about 70° C. or more, such as about 80° C. or more. The DTUL may be about 130° C. or less, such as about 120° C. or less, such as about 110° C. or less, such as about 100° C. or less, such as about 90° C. or less, such as about 80° C. or less, such as about 75° C. or less. The DTUL may be determined according to ASTM D648-18 at 66 psi.

The polyolefin polymer may also have a particular elongation at break. For instance, the elongation at break may be about 1,000% or less, such as about 800% or less, such as about 600% or less, such as about 500% or less, such as about 400% or less, such as about 300% or less, such as about 250% or less, such as about 200% or less, such as about 150% or less, such as about 100% or less, such as about 50% or less. The elongation at break may be about 0.5% or more, such as about 1% or more, such as about 2% or more, such as about 5% or more, such as about 10% or more, such as about 25% or more, such as about 50% or more, such as about 100% or more, such as about 250% or more, such as about 500% or more, such as about 750% or more. For instance, the elongation at break may be relatively higher for a polyolefin copolymer, such as a polyolefin copolymer elastomer, than a polyolefin homopolymer. The elongation at break may be determined according to ASTM D638-14.

Furthermore, it should be understood that polyolefin polymers as disclosed herein can be synthesized using any technique generally known in the art. For instance, the polymer can be synthesized using any known process utilizing catalysts, activators, reagents as generally known in the art. In this regard, the method for making or polymerizing the polyolefin polymer is not limited by the present invention.

III.D. Polyethylene

The rigid co-extruded polymeric film of the present invention may include one or more layers comprising polyethylene (PE) or an interpolymer of polyethylene. Any polyethylene or its interpolymer suitable for the rigid co-extrusion film may be used. For example, the PE polymeric material can be MDPE, HDPE, LLDPE, LDPE or blends thereof.

In one embodiment, the polyethylene comprising layer can comprise about 10-100% by weight of the preferred ethylene/α-olefin interpolymer and can contain up to 90% by weight of a polymer of ultralow density polyethylene (ULDPE), which is an ethylene/octene-1 copolymer having a density in the range of about 0.910 to 0.914 g/cm³ and a melt index of about 0.7 to 1.0 dg/min, or a linear low density polyethylene (LLDPE), which is ethylene/octene-1 copolymer, having a density in the range of about 0.917 to 0.925 g/cm³ and a melt index of about 0.7 to 1.0 dg/min.

In one embodiment, the polyethylene layer comprises about 75-90% by weight of an ultra-low-density polyethylene (ULDPE), having a density in the range of about 0.911 to 0.913 g/cm$^3$ and a melt index of about 0.8 to 0.9 dg/min; and 10-25% by weight of a linear, low-density polyethylene (LLDPE), which is an ethylene/octene-1 copolymer, having a density in the range of about 0.918 to 0.922 g/cm$^3$ and a melt index of about 0.8 to 0.9 dg/min.

In another embodiment, the PE layer comprises an ethylene-α-olefin copolymer. The ethylene-α-olefin copolymer is in the range of from about 0 to about 15 parts by weight of said PE layer. The copolymer is an ultra-low-density copolymer of ethylene and an at least one $C_4$-$C_{10}$ α-olefin manufactured in a polymerization process using a single-site polymerization catalyst, with a density in the range of from about 0.859 to about 0.905 g/cm3 and a melt-index in the range of from about 0.4 to about 1.1 dg/min. The density can be defined by any number below, or as a range defined by any two numbers including the end-points of the range from about 0.859, about 0.860, about 0.861, . . . , about 0.903, about 0.904, and about 0.905 g/cm3. Similarly, the melt-index can be defined by any number below, or as a range defined by any two numbers including the endpoints of the range from about 0.4, about 0.45, about 0.5, . . . , about 0.95, about to, about 1.05 and about 1.1 dg/min.

In another embodiment, the ethylene-α-olefin copolymer is in the range of from about 0 parts to 15 parts by weight, and can be manufactured in a polymerization process using either a single-site or Zeigler-Natta polymerization catalyst, wherein said copolymer has a density in the range of from about 0.909 to about 0.935 g/cm3 and a melt-index in the range of from about 0.5 to about 1.5 dg/min. In other embodiments, the weight percent of the ethylene-α-olefin copolymer can be defined by any number below, or as a range defined by any two numbers including the endpoints of the range from about 0.0, 0.5, about 1.0, about 1.5, about 2.0, about 2.5, about 3.0, about 3.5, about 4.0. about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5 and about 15.0 parts by weight. The density can be defined by any number below, or as a range defined by any two numbers including the endpoints of the range from about 0.909, about 0.910, about 0.911, . . . , about 0.933, about 0.934, and about 0.935 g/cm3. Similarly, the melt-index range can be defined by any two numbers from about 0.5, about 0.55, about 0.60, . . . , about 1.40, about 1.45, and about 1.50-dg/min.

In another embodiment, the foregoing low-density copolymer of ethylene and at least one $C_4$-$C_{10}$ α-olefin, or said at least one ultra-low density copolymer of ethylene and at least one $C_4$-$C_{10}$ α-olefin is selected from ethylene/butene-1 copolymers, ethylene/hexene-1 copolymers, ethylene/octene-1 copolymers, ethylene/octene-1/butene-1 terpolymers and ethylene/hexene-1/butene-1 terpolymers.

In one embodiment, the polyethylene is a polymer or a polymer blend comprising from 0-100% by weight or preferably about 30-70%, or more preferably 30-50% by weight of a linear, low-density polyethylene (LLDPE) of ethylene/octene-1 copolymer having a density of about 0.910 to 0.920 g/cm$^3$ and melt index of about 0.8 to 1.2 dg/min; and from 0-100% by weight of a linear, low density polyethylene (LLDPE) such as ethylene/butene-1 copolymer, or low density ethylene/hexene-1 copolymer, having a density of about 0.918 to 0.930 g/cm$^3$, and a melt index of about 0.8 to 1.2 dg/min, or preferably of 70-30% by weight of, or more preferably 50-70% by weight said copolymers.

The $C_4$-$C_{10}$ α-olefin also includes the cyclic counterparts.

III.E. Hydrocarbon Resin

The polymeric film structure as disclosed herein comprises a 2-layer PP stack, of which one of the layers, which is not predominately polypropylene, but is a barrier layer that comprises predominately polypropylene and a hydrocarbon resin.

In general, these hydrocarbon resins include those resins made from petroleum-based feedstocks. For example, these resins may be synthesized from fractionation byproducts of petroleum cracking. In particular, these hydrocarbon resins may generally include those resins produced by the hydrogenation of the resinous polymerization products obtained by the polymerization of mixed unsaturated monomers derived from the deep cracking of petroleum, as well as higher polymers obtained by polymerization and/or copolymerization of terpene hydrocarbons, which may be followed by hydrogenation under pressure.

The hydrocarbon resins may include, but are not limited to, aliphatic hydrocarbon resins, aromatic hydrocarbon resins, aliphatic/aromatic hydrocarbon resins, or a mixture thereof. For example, an aliphatic/aromatic hydrocarbon resin may be a partially hydrogenated aromatic hydrocarbon resin. Further, regarding the aliphatic hydrocarbon resins, they may be cycloaliphatic hydrocarbon resins. The hydrocarbon resin may in addition to the above or alternatively polyterpene resins, terpene-phenol resins, rosin esters, rosin acids, grafted resins, and mixtures thereof.

In one embodiment, the hydrocarbon resin may include an aliphatic, such as an at least partially hydrogenated aliphatic hydrocarbon resin. In another embodiment, the hydrocarbon resin may include an aliphatic/aromatic hydrocarbon resin, such as an at least partially hydrogenated aliphatic aromatic hydrocarbon resin. In a further embodiment, the hydrocarbon resin may include an aromatic resin, such as an at least partially hydrogenated aromatic hydrocarbon resin. In another further embodiment, the hydrocarbon resin may include a cycloaliphatic hydrocarbon resin, such as an at least partially hydrogenated cycloaliphatic resin. In another embodiment, the hydrocarbon resin may include a cycloaliphatic/aromatic hydrocarbon resin, such as an at least partially hydrogenated cycloaliphatic/aromatic hydrocarbon resin. In another further embodiment, the hydrocarbon resin may include a polyterpene resin, a terpene-phenol resin, a rosin ester, a rosin acid, a grafted resin, or a mixture thereof.

In one embodiment, the hydrocarbon resin may be an aromatic resin or a non-aromatic resin. In one embodiment, the hydrocarbon resin may be an aromatic resin. In another embodiment, the hydrocarbon resin may be a non-aromatic resin. For example, the hydrocarbon resin may be an aliphatic resin or an aliphatic/aromatic resin. Regardless, the hydrocarbon resin may have an aromatic content of 0 wt. % or more, such as about 1 wt. % or more, such as about 2 wt. % or more, such as about 5 wt. % or more, 10 wt. % or more, such as about 15 wt. % or more. The aromatic content may be less than 100 wt. %, such as about 90 wt. % or less, such as about 70 wt. % or less, such as about 60 wt. % or less, such as about 50 wt. % or less, such as about 40 wt. % or less, such as about 20 wt. % or less, such as about 15 wt. % or less, such as about 10 wt. % or less, such as about 5 wt. % or less, such as about 2 wt. % or less, such as about 1 wt. % or less, such as about 0.5 wt. % or less. In one embodiment, the hydrocarbon resin may have an aromatic content of 0 wt. %.

In general, the hydrocarbon resin may comprise a hydrocarbon resin produced by the polymerization of various monomers. For example, these may include dienes (e.g., linear dienes), aromatic monomers, and natural monomers. In general, some of these monomers may be derived from naphtha. The diene monomers may include a piperylene, such as 1,3-pentadiene, 2-methyl-2-butene, etc. The diene monomers may also include cyclopentadiene and dicyclopentadiene. In addition, the aromatic monomers may include but are not limited to, styrene (including derivatives thereof), indene (including derivatives thereof), and others from a $C_9$-aromatic naptha stream. As an example, the styrene aromatics may include styrene, derivatives of styrene, and substituted styrenes. Particular examples of aromatics may include styrene, alpha-methylstyrene, beta-methylstyrene, indene, methylindene, and vinyl toluene. The natural monomers may also include natural monomers such as terpenes such as alpha-pinene or beta-carene. Furthermore, it should be understood that these monomers may be used alone or in combination. In particular, one or more of the aromatic monomers and/or one or more of the natural monomers may be used in combination with the diene.

The hydrocarbon resins may be polymerized using any technique as generally known in the art. For instance, in the polymerization, a catalyst may generally be employed. The catalyst may include, but is not limited to, AlCl3 and BF3. The polymerization may also utilize other modifiers or reagents. For example, the polymerization may utilize weight control modifiers to control the molecular weight distribution of the hydrocarbon resin. These may include, but are not limited to, mono-olefin modifiers such as 2-methyl, 2-butene, and the like. They may also be used to control the MWD of the final resin.

Specific examples of commercially available hydrocarbon resins include rosins and rosin esters, phenol modified styrene and methyl styrene resins, styrenated terpene resins, terpene-aromatic resins, terpene phenolic resins, aliphatic aromatic resins, cycloaliphatic/aromatic resins, $C_5$ aliphatic resins, $C_9$ aliphatic resins, $C_9$ aromatic resins, $C_9$ aliphatic/aromatic resins, acid modified $C_5$ resins, $C_5/C_9$ resins, and acid modified $C_5/C_9$ resins, mixed aromatic/cycloaliphatic resins, hydrogenated terpene aromatic resins, and mixtures thereof. In one particular embodiment, the hydrocarbon resin may include a $C_9$ resin, such as an aromatic $C_9$ resin.

In addition, it should be understood that some of these resins may be polymerized. For example, a $C_5$ monomer based resin may be a polymerization product of at least a $C_5$ monomer. Similar, a $C_9$ monomer based resin may be a polymerization product of at least a $C_9$ monomer. The $C_5$ monomers may include, for example, 1-pentene, isoprene, cyclopentadiene, 1,3-pentadiene, or a mixture thereof. The $C_9$ monomers may include, for example, indene, vinyltoluene, .alpha.-methylstyrene, .beta.-methylstyrene, or a mixture thereof.

Also, the hydrocarbon resin may be hydrogenated. For instance, the hydrocarbon resin may be partially, substantially, or fully hydrogenated. For instance, in one embodiment, the hydrocarbon resin may be at least partially hydrogenated. In another embodiment, the hydrocarbon resin may be substantially hydrogenated. In a further embodiment, the hydrocarbon may be fully hydrogenated. In this regard, as used herein, "at least partially hydrogenated" means that the resin may contain less than 90% olefinic protons, such as less than 80% olefinic protons, such as less than 70% olefinic protons, such as less than 60% olefinic protons, such as less than 50% olefinic protons, such as less than 40% olefinic protons, such as less than 30% olefinic protons, such as less than 25% olefinic protons and may contain 5% or more olefinic protons, such as 10% or more olefinic protons, such as 15% or more olefinic protons, such as 20% or more olefinic protons, such as 25% or more olefinic protons, such as 30% or more olefinic protons. In addition, as used herein, "substantially hydrogenated" means that the resin may contain less than 5% olefinic protons, such as less than 4% olefinic protons, such as less than 3% olefinic protons, such as less than 2% olefinic protons and may contain 0.1% or more olefinic protons, such as 0.5% or more olefinic protons, such as 0.8% or more olefinic protons, such as 1% or more olefinic protons, such as 1.5% or more olefinic protons, such as 2% or more olefinic protons.

Regarding hydrogenation, the degree of hydrogenation may be 50% or more, such as 60% or more, such as 70% or more, such as 80% or more, such as 85% or more, such as 90% or more, such as 95% or more, such as 96% or more, such as 97% or more, such as 98% or more, such as 99% or more, such as 100%. The degree of hydrogenation may be 100% or less, such as 99% or less, such as 98% or less, such as 95% or less, such as 90% or less, such as 85% or less, such as 80% or less, such as 75% or less. Without intending to be limited by theory, the degree of hydrogenation may impact the barrier properties. For instance, a higher degree of hydrogenation may improve the barrier properties of the material and resulting layer/film.

In one embodiment, the hydrocarbon resin may comprise one or more oligomers. For instance, such oligomers may include a dimer, a trimer, a tetramer, a pentamer, and/or a hexamer. The oligomers may be derived from a petroleum distillate boiling in the range of 30° to 210° C. and/or may be a byproduct of resin polymerization. The oligomer may have a number average molecular weight of about 100 g/mol or more, such as about 115 g/mol or more, such as about 130 g/mol or more, such as about 150 g/mol or more, such as about 175 g/mol or more, such as about 200 g/mol or more to about 500 g/mol or less, such as about 450 g/mol or less, such as about 400 g/mol or less, such as about 350 g/mol or less, such as about 300 g/mol or less, such as about 270 g/mol or less, such as about 250 g/mol or less, such as about 225 g/mol or less. The molecular weight may be determined using techniques known in the art, such as gel permeation chromatography.

These oligomers may include, but are not limited to, oligomers of cyclopentadiene, oligomers of substituted cyclopentadiene, oligomers of cyclopentadiene and substituted cyclopentadiene, oligomers of $C_4$-$C_6$ conjugated diolefins, oligomers of $C_8$-$C_{10}$ aromatic olefins, and combinations thereof. Furthermore, other monomers may also be present and may include $C_4$-$C_6$ mono-olefins, terpenes, and/or aromatic monomers. Furthermore, as indicated above, it should be understood that such oligomers may be at least partially hydrogenated or substantially hydrogenated.

In one particular embodiment, the hydrocarbon resin may be one derived from a cyclopentadiene. In this regard, the hydrocarbon resin may be a polycyclopentadiene. For instance, the hydrocarbon resin may be one produced by the polymerization (e.g., thermal polymerization) of a cyclopentadiene. For instance, the polymerization may be of cyclopentadiene (e.g., unsubstituted cyclopentadiene), a substituted cyclopentadiene, dicyclopentadiene, methylcyclopentadiene, or a mixture thereof. Such resin may also further include aliphatic or aromatic monomers as described herein. Such cyclopentadienes may be present in the hydrocarbon resin in an amount of 50 wt. % or more, such as about 60 wt. % or more, such as about 70 wt. % or more, such as about 80 wt. % or more, such as about 85 wt. % or more, such as about 90 wt. % or more, such as about 93 wt. % or more of the hydrocarbon resin. The cyclopentadienes may constitute less than 100 wt. %, such as about 99.5 wt. % or less, such as about 99 wt. % or less, such as about 98 wt. % or less, such as about 97 wt. % or less, such as about 95 wt. % or less, such as about 90 wt. % or less of the hydrocarbon resin.

In one particular embodiment, dicyclopentadiene may constitute a majority of the cyclopentadienes utilized in forming the hydrocarbon resin. In this regard, the dicyclopentadiene may constitute at least 50 wt. %, such as at least 60 wt. %, such as at least 70 wt. %, such as at least 80 wt. %, such as at least 85 wt. %, such as at least 90 wt. % to 100 wt. % or less, such as about 99 wt. % or less, such as about 97 wt. % or less, such as about 95 wt. % or less, such as about 90 wt. % or less of the cyclopentadienes utilized in the hydrocarbon resin. Furthermore, the aforementioned weight percentages may also apply to the total amount of dicyclopentadiene present in the hydrocarbon resin.

As indicated herein, the hydrocarbon resin may include a styrene. In this regard, the styrenic monomer may be utilized in an amount of at least 1 wt. %, such as at least 5 wt. %, such as at least 10 wt. % to 30 wt. % or less, such as 20 wt. % or less, such as 15 wt. % or less, such as 10 wt. % or less, such as 5 wt. % or less in the hydrocarbon resin. In one embodiment, the hydrocarbon resin may be substantially free of a styrenic monomer. For instance, it may be present in an amount of less than 1 wt. %, such as less than 0.5 wt. %, such as less than 0.1 wt. %, such as 0 wt. %.

As also indicated herein, the hydrocarbon resin may include an indene. In this regard, the indenic monomer may be utilized in an amount of at least 1 wt. %, such as at least 5 wt. %, such as at least 10 wt. % to 30 wt. % or less, such as 20 wt. % or less, such as 15 wt. % or less, such as 10 wt. % or less, such as 5 wt. % or less in the hydrocarbon resin. In one embodiment, the hydrocarbon resin may be substantially free of an indenic monomer. For instance, it may be present in an amount of less than 1 wt. %, such as less than 0.5 wt. %, such as less than 0.1 wt. %, such as 0 wt. %.

The hydrocarbon resin may have a certain viscosity as determined in accordance with ASTM D3236-15 at a temperature of 160° C. using a Brookfield viscometer and a size 21 spindle. The viscosity may be about 500 centipoise or more, such as about 700 centipoise or more, such as about 1,000 centipoise or more, such as about 1,500 centipoise or more, such as about 2,000 centipoise or more, such as about 3,000 centipoise or more, such as about 5,000 centipoise or more, such as about 8,000 centipoise or more, such as about 10,000 centipoise or more, such as about 13,000 centipoise or more, such as about 15,000 centipoise or more, such as about 18,000 centipoise or more, such as about 20,000 centipoise or more. The viscosity may be about 100,000 centipoise or less, such as about 80,000 centipoise or less, such as about 60,000 centipoise or less, such as about 50,000 centipoise or less, such as about 30,000 centipoise or less, such as about 25,000 centipoise or less, such as about 20,000 centipoise or less, such as about 17,000 centipoise or less, such as about 15,000 centipoise or less, such as about 12,000 centipoise or less, such as about 10,000 centipoise or less, such as about 7,000 centipoise or less, such as about 5,000 centipoise or less, such as about 4,000 centipoise or less, such as about 3,000 centipoise or less, such as about 2,000 centipoise or less, such as about 1,500 centipoise or less, such as about 1,000 centipoise or less, such as about 900 centipoise or less, such as about 800 centipoise or less, such as about 750 centipoise or less, such as about 700 centipoise or less, such as about 650 centipoise or less, such as about 625 centipoise or less, such as about 600 centipoise or less, such as about 550 centipoise or less.

The hydrocarbon resin may also have a certain molecular weight. For instance, the hydrocarbon resin may have a weight average molecular weight of about 200 g/mol or more, such as about 300 g/mol or more, such as about 400 g/mol or more, such as about 500 g/mol or more, such as about 600 g/mol or more, such as about 700 g/mol or more, such as about 800 g/mol or more, such as about 1,000 g/mol or more, such as about 1,200 g/mol or more, such as about 1,300 g/mol or more, such as about 1,500 g/mol or more, such as about 1,700 g/mol or more. The weight average molecular weight may be about 5,000 g/mol or less, such as about 4,000 g/mol or less, such as about 3,000 g/mol or less, such as about 2,500 g/mol or less, such as about 2,300 g/mol or less, such as about 2,000 g/mol or less, such as about 1,800 g/mol or less, such as about 1,600 g/mol or less, such as about 1,500 g/mol or less, such as about 1,400 g/mol or less, such as about 1,200 g/mol or less, such as about 1,000 g/mol or less, such as about 800 g/mol or less, such as about 700 g/mol or less, such as about 600 g/mol or less. The molecular weight may be determined using techniques known in the art, such as gel permeation chromatography.

Similarly, the hydrocarbon resin may have a number average molecular weight of about 200 g/mol or more, such as about 300 g/mol or more, such as about 400 g/mol or more, such as about 500 g/mol or more, such as about 600 g/mol or more, such as about 700 g/mol or more, such as about 800 g/mol or more, such as about 1,000 g/mol or more, such as about 1,200 g/mol or more, such as about 1,300 g/mol or more, such as about 1,500 g/mol or more, such as about 1,700 g/mol or more. The number average molecular weight may be about 5,000 g/mol or less, such as about 4,000 g/mol or less, such as about 3,000 g/mol or less, such as about 2,500 g/mol or less, such as about 2,300 g/mol or less, such as about 2,000 g/mol or less, such as about 1,800 g/mol or less, such as about 1,600 g/mol or less, such as about 1,500 g/mol or less, such as about 1,400 g/mol or less, such as about 1,200 g/mol or less, such as about 1,000 g/mol or less, such as about 800 g/mol or less, such as about 700 g/mol or less, such as about 600 g/mol or less. In this regard, the hydrocarbon resin may have a polydispersity index of about 1 or more, such as about 1.2 or more, such as about 1.5 or more, such as about 1.6 or more, such as about 1.7 or more, such as about 1.8 or more, such as about 1.9 or more, such as about 2 or more, such as about 2.3 or more, such as about 2.5 or more to about 20 or less, such as about 10 or less, such as about 8 or less, such as about 5 or less, such as about 4.5 or less, such as about 4 or less, such as about 3.5 or less, such as about 3 or less. The molecular weight may be determined using techniques known in the art, such as gel permeation chromatography.

In this regard, in one embodiment, the hydrocarbon resin may be considered a low molecular weight hydrocarbon resin. In one particular embodiment, the hydrocarbon resin may be considered a high molecular weight hydrocarbon resin.

In addition, the hydrocarbon resin may have a particular glass transition temperature. For instance, the glass transition temperature may be about 0° C. or more, such as about 20° C. or more, such as about 30° C. or more, such as about 40° C. or more, such as about 50° C. or more, such as about 60° C. or more, such as about 70° C. or more, such as about 80° C. or more, such as about 100° C. or more. The glass transition temperature may be about 250° C. or less, such as about 200° C. or less, such as about 180° C. or less, such as about 160° C. or less, such as about 150° C. or less, such as about 130° C. or less, such as about 100° C. or less, such as about 90° C. or less, such as about 80° C. or less, such as about 60° C. or less. The glass transition temperature may be determined using techniques known in the art, such as differential scanning calorimetry.

Further, the hydrocarbon resin may have a particular flash point. For instance, the flash point temperature may be about 100° C. or more, such as about 125° C. or more, such as about 150° C. or more, such as about 175° C. or more, such as about 190° C. or more, such as about 200° C. or more, such as about 210° C. or more, such as about 215° C. or more, such as about 220° C. or more, such as about 230° C. or more. The flash point temperature may be about 400° C. or less, such as about 350° C. or less, such as about 300° C. or less, such as about 280° C. or less, such as about 260° C. or less, such as about 250° C. or less, such as about 240° C. or less, such as about 230° C. or less. The flash point temperature may be determined using techniques known in the art, such as in accordance with ASTMD92-90.

Also, the hydrocarbon resin may have a particular ring and ball softening point, as determined according to ASTM E-28 (Revision 1996) at a heating and cooling rate of 10° C./min. For example, the softening point may be about 0° C. or more, such as about 20° C. or more, such as about 40° C. or more, such as about 50° C. or more, such as about 60° C. or more, such as about 80° C. or more, such as about 100° C. or more, such as about 110° C. or more, such as about 115° C. or more, such as about 120° C. or more, such as about 125° C. or more. The softening point may be about 250° C. or less, such as about 225° C. or less, such as about 200° C. or less, such as about 180° C. or less, such as about 160° C. or less, such as about 150° C. or less, such as about 140° C. or less, such as about 130° C. or less, such as about 125° C. or less, such as about 120° C. or less.

In addition, the hydrocarbon resin may also have a particular aniline point, which is generally the minimum temperature at which equal volumes of aniline and the resin are miscible. Without intending to be limited by theory, the aniline point may provide an indication of the aromatic hydrocarbon content of the resin. For example, the aniline point may be about 0° C. or more, such as about 20° C. or more, such as about 40° C. or more, such as about 50° C. or more, such as about 60° C. or more, such as about 80° C. or more, such as about 100° C. or more, such as about 107° C. or more, such as about 110° C. or more, such as about 115° C. or more, such as about 120° C. or more, such as about 125° C. or more. The aniline point may be about 250° C. or less, such as about 225° C. or less, such as about 200° C. or less, such as about 180° C. or less, such as about 160° C. or less, such as about 150° C. or less, such as about 140° C. or less, such as about 130° C. or less, such as about 125° C. or less, such as about 120° C. or less. In general, equal volumes of aniline and the resin are stirred continuously and heated until the two merge to provide a homogeneous solution; then, the heating is stopped and the temperature at which both phases separate is recorded as the aniline point. The aniline point can be determined in accordance with ASTM D611-12.

III.F. Ethylene-Vinyl Alcohol Copolymer Barrier Layer

The rigid co-extruded polymeric film of the present invention may include one or more layers comprising EVOH, which also function as barrier layers.

The ethylene molar percent in the ethylene-vinyl alcohol copolymer or the EVOH copolymer is in the range of from about 20 to about 55%. Lower ethylene content in the EVOH polymers corresponds to improved barrier properties. Stated another way, the ethylene molar percent in the EVOH copolymer is a number selected from the following set of numbers:

20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, and 55.

In one embodiment, the ethylene molar percent in the EVOH layers is a number within a range defined by any two of the above numbers, including end-points.

EVOH may include saponified or hydrolyzed ethylene-vinyl acetate copolymers, such as those having a degree of hydrolysis of at least 50%. Stated another way, the degree of hydrolysis, in percent, is any one of the following numbers:

50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100.

It is also contemplated that two or more different EVOH copolymer as described herein may be used for the EVOH layer.

Preferably, the EVOH layer has a thickness in the range of from 0.8 to 50 microns.

III.G. Polyamide and Polyester Barrier Layers

The additional layers may also advantageously comprise a polymeric material selected from the group of polymers with the general name of polyamide or nylon. Polyamides include for example PA6 and PA66. These polymeric films also include biaxially oriented polyamides.

A polyester barrier layer may also be included in the rigid films of the present invention. Polyesters for example, include PET, PBT, 3GT, etc. These polymeric films also include biaxially oriented polyesters.

The polyamides and the polyesters can be uniaxially or biaxially-oriented polymers.

III.H. Optional Additives

The PP-stack layer or the barrier layer or the other layers in the polymeric film structure may include any additional additives as generally utilized in the art. Furthermore, the additional layers as defined herein may also include such additives.

These additives may include, but are not limited to, nucleating agents, clarifiers, slip additives, anti-blocking additives (e.g., silica), colored pigments, UV stabilizers, antioxidants, light stabilizers, flame retardants, antistatic agents, biocides, viscosity-breaking agents, impact modifiers, plasticizers, fillers, reinforcing agents, lubricants, mold release agents, blowing agents, pearlizers, etc.

In one embodiment, a nucleating agent may be utilized. In general, the nucleating agent may have a molecular weight of about 1,000 g/mol or less, such as about 800 g/mol or less, such as about 500 g/mol or less, such as about 300 g/mol or less, such as about 200 g/mol or less. In general, the nucleating agent may be utilized to decrease the crystallization time of a thermoplastic material.

The nucleating agents may include, but are not limited to, sodium benzoate, talc, glycerol alkoxide salts, cyclic carboxylic acid salts, bicyclic carboxylic acid salts, glycerolates, phosphines, phosphates, hexahydrophtalic acid salts, sugar alcohols, etc.

For instance, the sugar alcohols may include mannitol or mannitol based compounds, sorbitol or sorbitol based compounds, nonitol or nonitol based compounds such as 1,2,3-trideoxy-4,6:5,7-bis-0-((4-propylphenyl) methylene) nonitol, etc.

For instance, the phosphines may include a salt, such as a sodium salt, of 2,4,8,10-tetra(tert-butyl)-6-hydroxy-12H-dibenzo[d,g][1,3,2]diox-aphosphocin 6-oxide.

The phosphates may include hydroxy-bis[2,2'-methylenebis[4,6-di(tert-butyl)phenyl]phosphate, 2,2'-methylenebis(4,6-di-tert-butylphenyl)phosphate, a salt thereof, or a mixture thereof. The salt may be an aluminum salt, a lithium salt, a sodium salt, or a mixture thereof.

Other nucleating agents may include, but are not limited to diols (e.g., (1R)-1-[(4R,4aR,8aS)-2,6-bis(3,4-dimethylphenyl)-4,4a,8,8a-tetrahydro-[1,–3]dioxino[5,4-d][1,3]dioxin-4-yl]ethane-1,2-diol, 1-[8-propyl-2,6-bis(4-propylphenyl)-4,4a,8,8a-tetrahydro[1,3]dioxino[5,4--d][1,3]dioxin-4-yl]ethane-1,2-diol, etc.).

Other nucleating agents include amides (e.g., N-[3,5-bis(2,2-dimethylpropanoylamino)phenyl]-2,2-dimethylpropanamide), a salt, such as a calcium salt, of (1S,2R)-cyclohexane-1,2-dicarboxylate with zinc octadecenoate, and/or cis-endo-bicyclo[2,2,1]heptane-2,3-dicarboxylic acid disodium salt with 13-docosenamide, (Z)- and amorphous silicon dioxide.

In one particular embodiment, the nucleating agent may include at least one bicyclic carboxylic acid salt, such as a bicycloheptane dicarboxylic acid, disodium salt such as bicyclo [2.2.1] heptane dicarboxylate. For instance, the nucleating agent may include a blend of bicyclo [2.2.1] heptane dicarboxylate, disodium salt, 13-docosenamide, and amorphous silicon dioxide.

In another embodiment, the nucleating agent may include a cyclohexanedicarboxylic acid, calcium salt or a blend of cyclohexanedicarboxylic acid, calcium salt, and zinc stearate.

In one embodiment, one of the layers may include a nucleating agent, a slip additive, an anti-blocking additive, or a mixture thereof. For instance, in one embodiment, the additive may include at least a nucleating agent. In another embodiment, the additive may include at least a slip additive. In a further embodiment, the additive may include at least an anti-blocking additive. In another further embodiment, the additive may include a mixture of at least two of a nucleating agent, a slip additive, and an anti-blocking additive. In another embodiment, the additive may include a mixture of a nucleating agent, a slip additive, and an anti-blocking additive.

The individual layers and/or polymeric film substrate may include such additives in an amount of about 20 wt. % or less, such as about 15 wt. % or less, such as about 10 wt. % or less, such as about 8 wt. % or less, such as about 5 wt. % or less, such as about 4 wt. % or less, such as about 3 wt. % or less, such as about 2 wt. % or less, such as about 1 wt. % or less, such as about 0.5 wt. % or less, such as about 0.3 wt. % or less, such as about 0.1 wt. % or less, such as 0 wt. %. The additive may be provided in an amount of about 0.001 wt. % or more, such as about 0.005 wt. % or more, such as about 0.01 wt. % or more, such as about 0.05 wt. % or more, such as about 0.1 wt. % or more, such as about 0.5 wt. % or more. In this regard, it should be understood that such additives may not be present within a layer in one embodiment.

Advantageously, the following additives are preferred.

The range of the slip agents that can be used is from about 200 to 2000 ppm or 0.5-2.5% by weight of a layer. A preferred slip agent is erucamide or other fatty acid amide, such as, oleamide. The slip agent lowers the coefficient friction of the film and allows it to slide readily over various surfaces.

Any film anti-blocking agent well known to skilled workman may be added to the film layers in the range of about 1000-5000 ppm or 0.5-2.5% by weight of a layer. Typical anti-blocking agents, such as, diatomaceous earth, synthetic silica or talc can be added to the inner and outer sealant layers of the film. The anti-blocking material is particularly useful in reducing the coefficient of friction between the film and the metallic surfaces over which the film is drawn during the bag making process.

Any processing aid well known to skilled workman, preferably and not limited to fluoro-elastomer based polymer may be added to outer and inner sealing layers of a polymeric film substrate.

The present invention also is directed to a flexible-container containing packaged material, said container can be made from the previously described multi-layer film in FFS processing. The FFS processes and its modifications are described in U.S. Pat. Nos. 5,538,590, 9,327,856 and 9,440,757 and are incorporated by reference herein in their entirety.

Although melt-index ranges are specified herein, it is understood that the polymers have melt indices typical of film-grade polymers can be used. The multi-layer films of the present invention have the ability to form a lap seal as well as a fin seal. They also substantially reduce the curl in the laminate.

IV. Polymeric Film Structure—Barrier Film Embodiments

Exemplary embodiments of the invention are provided below:

IV.A.1. Embodiment 1

This embodiment includes a co-extruded, two-layered rigid film in the A–B construction. The first layer A predominately comprises regular polypropylene. The second layer B predominately comprises the Impede® polymer. The rigid film ranges from about X to about Y in thickness, as measured in inches. The rigid film of this embodiment provides improved barrier properties and improved stiffness.

The A–B weight content ranges independently from 10/90 to 90/10. In other words, the A content ranges from about 10% to about 90% by weight of the rigid film and the B content ranges from about 10% to about 90% by weight of the rigid film. Stated differently, the A and the B content by weight in the rigid film are selected from the following numbers, in percent weight of the rigid film of this embodiment of the present invention:

10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90.

The A and the B content are also within a range defined by any two numbers from the above list, including the endpoints of such range.

IV.A.2. Embodiment 2

This embodiment includes a co-extruded, three-layered rigid film in the A1–B–A2 construction. The first layer A1 predominately comprises regular polypropylene. The second layer B comprises the Impede® polymer. The third layer A2 predominately comprises regular PP which is the same grade as or different grade from the regular PP in first layer A1.

The rigid film ranges from about X to about Y in thickness, as measured in inches. The rigid film of this embodiment provides improved barrier properties and improved stiffness.

The A1–B–A2 weight content ranges independently from 43/14/43 to 10/80/10. In one embodiment, the A1 content independently ranges from about 10% to about 76% by weight of the rigid film. Similarly, the A2 content independently ranges from about 10% to about 76% by weight of the rigid film. The B content independently ranges from about 14% to about 80% by weight of the rigid film. Stated differently, the A1 and the A2 content by weight in the rigid film are selected from the following numbers, in percent weight of the rigid film of this embodiment of the present invention:

10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, and 76.

The A1 and the A2 content are also within a range defined by any two numbers from the above list, including the endpoints of such range.

Similarly, the B content by weight in the rigid film is selected from the following numbers, in percent weight of the rigid film of this embodiment of the present invention:

14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, and 80.

The B content is also within a range defined by any two numbers from the above list, including the endpoints of such range.

IV.A.3. Embodiment 3

This embodiment includes a co-extruded, 6-layered rigid film in the A1–BT1–C–T2–A2 construction that includes one 2-layered PP stack. The first layer A1 predominately comprises regular polypropylene. The second layer B comprises the Impede® PP polymer. The third layer T1 is a tie layer. The fourth layer C predominately comprises EVOH. The fifth layer T2 is a tie layer. The sixth layer A2 predominately comprises regular polypropylene, which is the same grade as or different grade from the regular PP in first layer A1.

The rigid film ranges from about X to about Y in thickness, as measured in inches. The rigid film of this embodiment provides improved barrier properties and improved stiffness.

The A1–B weight content ranges independently from 10/90 to 90/10. In other words, the A1 content ranges from about 10% to about 90% by combined weight of the two layers A1+B and the B content ranges from about 10% to about 90% by combined weight of the two layers A1+B. Stated differently, the A1 content and the B content as percent of their combined weight are selected from the following numbers, in percent weight of their combined weight:

10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90.

The A1 and the B content are also within a range defined by any two numbers from the above list, including the endpoints of such range.

IV.A.4. Embodiment 4

This embodiment includes a co-extruded, 8-layered rigid film in the A1–B1–T1–C–T2–B2–T3–D construction that includes one 2-layered PP stack. The first layer A1 predominately comprises regular polypropylene. The second layer B1 comprises the Impede® PP polymer. The third layer T1 is a tie layer. The fourth layer C predominately comprises EVOH. The fifth layer T2 is a tie layer. The sixth layer B2 predominately comprises Impede® polypropylene, which is the same grade as or different grade from the Impede® PP in second layer B1. The seventh layer is a tie layer. The 8$^{th}$ layer is a sealant layer.

The rigid film ranges from about X to about Y in thickness, as measured in inches. The rigid film of this embodiment provides improved barrier properties and improved stiffness.

The A1–B1 weight content ranges independently from 10/90 to 90/10. In other words, the A1 content ranges from about 10% to about 90% by combined weight of the two layers A1+B1 and the B1 content ranges from about 10% to about 90% by combined weight of the two layers A1+B1. Stated differently, the A1 content and the B1 content as percent of their combined weight are selected from the following numbers, in percent weight of their combined weight:

10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90.

The A1 and the B1 content are also within a range defined by any two numbers from the above list, including the endpoints of such range.

IV.A.5. Embodiment 5

This embodiment includes a co-extruded, 4-layered rigid film in the A1–B1–B2–A2 construction that includes two 2-layered PP stack. The first layer A1 predominately comprises regular polypropylene. The second layer B1 comprises the Impede® PP polymer. The third layer B2 comprises the Impede® PP polymer. The fourth layer A2 predominately comprises regular PP.

The rigid film ranges from about X to about Y in thickness, as measured in inches. The rigid film of this embodiment provides improved barrier properties and improved stiffness.

The A–B weight content ranges independently from 10/90 to 90/10. In other words, the (A1+A2) content ranges from about 10% to about 90% by weight of the rigid film and the (B1+B2) content ranges from about 10% to about 90% by weight of the rigid film. Stated differently, the (A1+A2) and the (B1+B2) content by weight in the rigid film are selected from the following numbers, in percent weight of the rigid film of this embodiment of the present invention:

10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90.

The (A1+A2) and the (B1+B2) content are also within a range defined by any two numbers from the above list, including the endpoints of such range.

IV.A.6. Embodiment 6

This embodiment includes a co-extruded, 7-layered rigid film in the A1–B1–A2–T1–A3–B2–A4 construction that includes two 3-layered PP stacks. The first layer A1 predominately comprises regular polypropylene. The second layer B1 comprises the Impede® PP polymer. The third layer B2 predominately comprises the regular PP polymer. The fourth layer is tie layer. The fifth layer A3 predominately comprises regular PP. The sixth layer B1 comprises the Impede® PP polymer. The seventh layer B2 predominately comprises the regular PP polymer.

The rigid film ranges from about X to about Y in thickness, as measured in inches. The rigid film of this embodiment provides improved barrier properties and improved stiffness.

The A–B weight content ranges independently from 10/90 to 90/10. In other words, the (A1+A2+A3+A4) content ranges from about 10% to about 90% by weight of the combined A and B polymers and the (B1+B2) content ranges from about 10% to about 90% by weight of the combined A and B polymers. Stated differently, the (A1+A2+A3+A4) and the (B1+B2) content by weight in the combined weight of the A and B polymers are selected from the following numbers, in percent weight of the combined weight of the A and B polymers:

10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90.

The (A1+A2+A3+A4) and the (B1+B2) content are also within a range defined by any two numbers from the above list, including the endpoints of such range.

IV.A.7. Additional Embodiment

Additional embodiments include the coextruded rigid films described exemplarily in Table 3 below, and some of them are pictorially represented in FIG. 1. The nomenclature of the coextruded films included in Table 3 are provided in Table 2.

TABLE 3

Nomenclature of the Film Structures for High Barrier Rigid Films

| Nomenclature | Description |
| --- | --- |
| A, for example, A1, A2, A3, . . . | Regular polypropylene; A1, A2, A3 . . . and can be same or different grades; maybe blends of two or more grades. |
| B, for example, B1, B2, B3, . . . | Impede ® polypropylene; B1, B2, B3 . . . and can be same or different grades; maybe blends of two or more grades. High crystallinity material. |
| C, for example, C1, C2, C3, . . . | EVOH; C1, C2, C3, . . . can be same or different grades of EVOH; they can be blends of two grades; and they can be blends of same or different grades with same or different polyvinyl acetate content. |
| D, for example D1, D2, D3, . . . | Polyethylene interpolymer, usually as outside sealant layer or inside sealant layer. D1, D2, D3, . . . can me same or different grades, or blends of two or more grades. |
| T, for example, T1, T2, T3, . . . | Tie layer, or an adhesive layer. T1, T2, T3, . . . can be the same or different grades of tie layers. |
| E, for example, E1, E2, E3, . . . | Barrier layer such as polyamide; E1, E2, E3, can be the same or different grades of polyamide or blends of two or more polyamides. This includes uniaxially or biaxially oriented polyamides. |
| F, for example, F1, F2, F3, . . . | Barrier layer such as polyester; E1, E2, E3, can be the same or different grades of polyesters or blends of two or more polyesters. This includes uniaxially or biaxially oriented polyesters. |

TABLE 4

Exemplary Co-Extruded Structures with High Barrier Properties

| No. of Layers | Structure |
| --- | --- |
| 4 | A1-B1-B2-A2 |
| 5 | A1-B1-A2-B2-A3 |
| 5 | A1-B1-B2-B3-A2 |
| 6 | A1-B1-A2-B2-B3-A3 |
| 6 | A1-B1-B2-A2-B3-A3 |
| 5 | A1-B1-T1-B2-A2 |
| 7 | A1-B1-A2-T1-A3-B2-A3 |
| 7 | A1-B1-T1-C1-T2-B2-A2 |
| 9 | A1-B1-A2-T1-C1-T2-A3-B2-A4 |
| 4 | D1-A1-B1-D2 |
| 6 | D1-T1-A1-B1-T2-D2 |
| 10 | D1-T1-A1-B1-A2-T2-A3-B2-T2-D2 |
| 10 | D1-T1-A1-B1-T2-C1-T3-B2-A2-D2 |
| | D1-T1-E1-A1-B1-A2-T2-C1-T3-A3-B2-A4-T4-F1-T5-D2 |

One preferred method of manufacturing film is the so-called blown film process. The film, after manufacture, is slit longitudinally into appropriate widths. The preferred method of manufacture of a multilayer film is by using a blown film co-extrusion process, although other methods of manufacture of the film may be used.

V. Shaped Articles from the Polymeric Film Structures

The polymeric film structure of the present invention may form at least part of a shaped polymeric article. The polymeric film structure and resulting shaped polymeric article may be formed using various techniques known in the art. These techniques may include, but are not limited to, thermoforming, blow molding, injection molding, compression molding, roto-molding, etc. For example, in one embodiment, the polymeric film structure and resulting shaped polymeric article may be formed via thermoforming to create a thermoformed shaped polymeric article. In another embodiment, the polymeric film structure and resulting shaped polymeric article may be formed via blow molding to create a blow molded shaped polymeric article. In a further embodiment, the polymeric film structure and resulting shaped polymeric article may be formed via injection molding to create an injection molded shaped polymeric article. In another further embodiment, the polymeric film structure and resulting shaped polymeric article may be formed via compression molding to create a compression molded shaped polymeric article. It should be understood, however, that other processing techniques may also be utilized according to the present invention.

In one embodiment, the polymeric film structure and shaped polymeric article as disclosed herein may be formed by exposing the barrier layer, for example the PP-stack layer, and any additional layers as defined herein to a thermoforming process. Thermoforming generally involves heating the layer(s) to a certain temperature, shaping the layer(s) within a mold, and then optionally trimming the shaped polymeric article to create the desired article.

The particular forming technique is not critical, and any of a variety of conventional processes may be employed in the present invention. Suitable techniques may include, for instance, vacuum forming, plug assist forming, drape forming, press forming, etc. For example, the layer(s) may be fed to a heating device (e.g., convection oven, resistance heater, infrared heater, etc.) that heats it to a temperature sufficient to cause the polymer(s) to deform or stretch. This temperature may generally be above the glass transition temperature, yet at or below the melting temperature. For example, the thermoforming temperature may be about 10° C. or more, such as about 20° C. or more, such as about 30° C. or more, such as about 40° C. or more, such as about 45° C. or more to about 100° C. or less, such as about 80° C. or less, such as about 60° C. or less below the melting temperature. For example, the layer(s) may be heated to a temperature of from about 30° C. or more, such as about 40° C. or more, such as about 50° C. or more, such as about 60° C. or more to about 200° C. or less, such as about 150° C. or less, such as about 130° C. or less, such as about 120° C. or less, such as about 110° C. or less. Once heated, the layer(s) may then be fed to a mold where a force (e.g., suctional force) is placed against the layer(s) to cause it to conform to the contours of the mold. The mold cavity imparts the shape of the article to the layer(s) and can also cool the material to a temperature significantly below the melting point so that it solidifies adequately to retain its shape upon removal from the mold.

In one embodiment, thermoforming process may be utilized. The film layers are fed to a heating device that heats the layers to a temperature sufficient to cause the layers to deform. As indicated above, any of a variety of heating devices may be employed in the thermoforming process. Once heated, the layers are fed to a molding device where they are molded into an article. As indicated above, any of a variety of molding devices may be employed in the thermoforming process. The layers may then conform to the contours of the mold resulting in the polymeric film structure and shaped polymeric article. Multiple layers or a single layer comprising that is a PP-stack as a just the barrier layer as disclosed herein can be used. In addition, thermoforming applications may also encompass form, fill, and seal applications as generally known in the art.

In another embodiment, the shaped polymeric article may be a blow molded shaped polymeric article. Blow molded articles may be formed using extrusion blow molding, injection blow molding, or injection stretch blow molding techniques. Regardless of the method, blow molding generally involves providing a polymeric material into a hollow mold cavity, shaping the material within the mold by blowing air, and then optionally trimming the shaped polymeric article to create the desired article. For instance, a polymeric material including the aforementioned components of the barrier layer (i.e., polyolefin polymer, hydrocarbon resin, and optional additives) may be provided directly into a hollow mold cavity. Once inserted, the mold closes and the parison is gripped into place. Then, a nozzle or pin may be inserted into an open end of the parison to introduce air which inflates the parison into the shape of the mold. The mold temperature may be about 0° C. or more, such as about 5° C. or more, such as about 10° C. or more, such as about 20° C. or more, such as about 30° C. or more, such as about 40° C. or more, such as about 45° C. or more than the melting temperature of the material. The mold temperature may be about 90° C. or less, such as about 85° C. or less, such as about 80° C. or less than the melting temperature of the material. In one embodiment, the mold temperature may be greater than 0° C. up to the crystalline temperature of the material. In certain embodiments, for example, the layer(s) may be heated to a temperature of from about 30° C. to about 150° C., in some embodiments from about 50° C. to about 130° C., and in some embodiments, from about 60° C. to about 120° C. within the mold until the layer(s) have taken shape. The mold cavity imparts the shape of the article to the layer(s) and can also cool the material to a temperature significantly below the melting point so that it solidifies adequately to retain its shape upon removal from the mold. In addition, cool air may be introduced into the mold to solidify the polymers. Once the layer(s) have taken shape, the mold is opened and the shaped polymeric article is allowed to be removed. Then, optionally, the shaped polymeric article is trimmed as necessary to create the desired article. One example of a blow molding process, in particular an injection stretch blow molding process is for forming a bottle.

Another processing technique that may be utilized according to the present invention is injection molding. In general, forming injection molded articles involves plasticization or heating of a polymeric material, injection of the material into a mold, packing the mold with the polymeric material, cooling the article, and demolding/ejection of the article.

Depending on the processing technique utilized, the polymeric film structure and shaped polymeric article may be monolayer or multilayer. In one embodiment, the polymeric film structure and shaped polymeric article may be monolayer. In another embodiment, the polymeric film structure and shaped polymeric article may be multilayer. For example, multilayer films and articles may be formed using thermoforming. Alternatively, monolayer films and articles may be formed using thermoforming, blow molding, or injection molding. Furthermore, with the above processing techniques, in some embodiments, the polymeric films and article disclosed herein may be non-oriented.

Furthermore, by utilizing the polyolefin polymer and the hydrocarbon resin as disclosed herein, the resulting substrate and barrier layer and/or polymeric material may undergo minimal mold shrinkage. For instance, the mold shrinkage may be 10% or less, such as 8% or less, such as 6% or less, such as 5% or less, such as 4% or less, such as 3% or less, such as 2.5% or less, such as 2% or less, such as 1.8% or less, such as 1.6% or less, such as 1.5% or less, such as 1.4% or less, such as 1.3% or less, such as 1.2% or less, such as 1.1% or less, such as 1% or less. The mold shrinkage may be 0.01% or more, such as 0.05% or more, such as 0.1% or more, such as 0.3% or more, such as 0.5% or more, such as 0.8% or more, such as 1% or more, such as 1.1% or more, such as 1.3% or more, such as 1.5% or more. Such mold shrinkage may be in the flow direction in one embodiment. In another embodiment, such mold shrinkage may be in the cross-flow direction. In a further embodiment, such mold shrinkage may be in the flow direction and the cross-flow direction.

With the mold shrinkage and mechanical properties as disclosed herein, the polymeric film structure and barrier layer may mimic other polymers, such as polystyrene, with its performance and attributes thereby allowing for these materials to be used in a wide variety of applications, some of which are provided herein. In particular, the material as disclosed herein may generally exhibit a flexural modulus, as well as other mechanical properties, that mimic other polymers in particular polystyrene.

As indicated above, the shaped polymeric article may have an average final wall thickness of more than 200 µm, such as 210 µm or more, such as 220 µm or more, such as 240 µm or more, such as 250 µm or more, such as 300 µm or more, such as 500 µm or more, such as 700 µm or more, such as 900 µm or more, such as 1 mm or more, such as 3 mm or more, such as 5 mm or more. The shaped polymeric article may have an average final wall thickness of 1.25 cm or less, such as 1 cm or less, such as 8 mm or less, such as 5 mm or less, such as 3 mm or less, such as 2 mm or less, such as 1 mm or less, such as 800 µm or less, such as 500 µm or less, such as 400 µm or less, such as 350 µm or less, such as 300 μm or less, such as 280 μm or less, such as 270 μm or less. Such average thickness may be obtained by obtaining an average of each wall thickness of the shaped polymeric article.

Regardless of the technique utilized, the polymeric film structure including the barrier layer may be shaped or utilized for a wide variety of different three-dimensional articles. For example, the resulting article may be a packaging product for the food, medical, or general retail industries, such as a package, cup, tub, pail, jar, box, container, lid, tray (e.g., for a food article), blister, clamshell, bottle, pouch, appliance part (e.g., refrigerator liner), pallet, etc.; automotive or aircraft part, such as a dash panel, door panel, utility vehicle bed, etc.; and so forth. In one particular embodiment, the shaped polymeric article may be a packaging article, such as a food packaging article. In particular, because of the materials utilized within the polymeric film structure and barrier layer, the film structure and layer may also pass U.S. Food and Drug Administration guidelines and compliance, in particular for use as a food packaging article.

Furthermore, even with the materials utilized with the polyolefin polymer as disclosed herein, the barrier layer and resulting polymeric film structure may also be recyclable. For instance, when the polyolefin polymer is a polypropylene, utilization of the specific materials as disclosed herein can still allow for the barrier layer and resulting polymeric film structure to be coded as a Class 5 material for recycling purposes.

While embodiments of the present disclosure have been generally discussed, the present disclosure may be further understood by the following, non-limiting examples.

EXPERIMENTAL

I. Test Methods

I.A. Melt Viscosity

Melt viscosity is measured in accordance with ASTM D 3236 (350° F.), using a Brookfield Digital Viscometer (Model DY-III, version 3), and disposable aluminum sample chambers. The spindle used, in general, is a SC-31 hot-melt spindle, suitable for measuring viscosities in the range from 10 to 100,000 centipoise. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn when the spindle is inserted and spinning. The sample (approximately 8-10 g of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate which leads to a torque reading in the range of 40 to 60 percent of the total torque capacity, based on the rpm output of the viscometer. Readings are taken every minute for about 15 minutes, or until the values stabilize, at which point, a final reading is recorded.

I.B. Melt Index

Melt index (I2, or MI) of an ethylene-based polymer is measured in accordance with ASTM D-1238, condition 190° C./2.16 kg. For high I2 polymers, that is, I2 is greater than, or equal to, 200 g/mole, melt index is preferably calculated from Brookfield viscosity as described in U.S. Pat. Nos. 6,335,410; 6,054,544; 6,723,810:

$$I_{2\ (190°\ C./12.16\ kg)} = 3.6126[10(\log(\eta)-6.6928)/-1.1363]-9.31851,\text{ where }\eta=\text{melt viscosity, in cP, at 350° F.}$$

I.C. Oxygen Transmission Rate

The Oxygen Transmission Rate (OTR) test determines the reduction in oxygen transmission in the rigid films that are used for preparing rigid containers of the present invention.

The OTR was determined at 23° C. and 80% relative humidity according to ASTM D 3985 standard. A suitably sized sample of rigid film was cut on the cutting mat using the MOCON template for the Mocon Oxtran machine. The cut sample was then positioned into the Mocon Oxtran and clamped into position according to the specific machine requirements. The parameter settings were based on industry standard tests. The sample was tested until the graph showed a plateau. The test times varied from 8 hours to 70 hours depending on the graph curve. All results were captured in units of $cm^3/100\ in^2$-day.

TABLE 5

Oxygen Transmission Rate

| Polymeric Sheet | OTR | % OTR Improvement over Polymer A |
|---|---|---|
| Polymer A 23H2A Random copolymer PP | 146.50 cc-mil/100 in²-day | — |
| Polymer B Impede ® MP 1250 Isotactic PP | 28.44 cc-mil/100 in²-day | 80% |
| 0.020" A-B-A Coex XPP 802 25/50/25 | 3.18 cc/100 in²-day (63.6 cc-mil/100 in²-day) | 98% |
| 0.040"- A-B-A Coex XPP 802 33/34/33 | 1.75 cc/100 in²-day (70 cc-mil/100 in²-day) | 99% |

In Table 6 below are provided data for OTR and Water Vapor Transmission Rate (WVTR or MVTR) for control samples and experimental samples that were extruded, thermoformed, or prepared in an FFS machine.

TABLE 6

Rigid Packaging Materials Comparison Data

Calculated OTR and MVTR based on 0.035" Starting Gauge

| Materials & Properties | OTR; cc · mil/ 100 in2/day | WVTR or MVTR g · mil/ 100 in2/day | Structure |
|---|---|---|---|
| Control Samples | | | |
| HIPS (LOW) | 10 | 0.17 | Monolayer |
| HIPS/EVOH/PE | 0.05 | 0.17 | Monolayer HIPS with |

TABLE 6-continued

Rigid Packaging Materials Comparison Data

Calculated OTR and MVTR based on 0.035" Starting Gauge

| Materials & Properties | OTR; cc · mil/ 100 in2/day | WVTR or MVTR g · mil/ 100 in2/day | Structure |
|---|---|---|---|
| LAMINATE (HIGH) | | | EVOH Film Lamination |
| GENERIC PP (LOW) | 6.85 | 0.012 | Monolayer |
| PET (MEDIUM | 0.29 | 0.17 | Monolayer |
| Experimental Samples | | | |
| XPP801- PP (MEDIUM) Barrier | 1.04 | 0.0022 | Monolayer |
| XPP802-PP (MEDIUM) FFS grade | 0.81 | 0.0022 | Monolayer |
| XPP803- PP (MEDIUM) Barrier | 1.03 | 0.0022 | Monolayer |
| XPTPC PP- Barrier and PS replacement | 1.21 | 0.007 | Monolayer |
| XPP/EVOH/PE LAMINATE (HIGH) | 0.05 | 0.0022 | Monolayer HIPS with EVOH Film Lamination |
| XPP/EVOH/XPP COEX (HIGH) | 0.0025 | 0.0022 | 6 or 8-layer co-extrusion |

From the above data it is evident that the barrier enhancement compared to polystyrene and generic polypropylene is as follows:

80% improvement in OTR compared to generic polypropylene

90% improvement in OTR compared to polystyrene

100% improvement in MVTR compared to polystyrene

80% improvement in MVTR compared to generic polypropylene

I.D. Differential Scanning calorimetry

Differential Scanning calorimetry (DSC) measures the heat flow into or out of material as a function of time or temperature. It determines polymer crystallinity, glass transition temperature of an amorphous polymer, and melting temperature for a crystalline polymer, based on the heat required to melt the polymer. DSC is used to measure crystallinity in polyethylene (PE) and polypropylene (PP) based samples, for example.

Two samples were tested by the DSC. The first sample was the XPP resin in pellet form (the "XPP Pellet" sample). The second sample consisted of a coextruded multi-layer sheet (A–B–A) consisting of outer layers of polypropylene (PP) with an inner core layer of barrier grade XPP polypropylene (the "Sheet") sample.

Samples were tested in accordance with using a TA Instruments Q200 DSC machine. The test method was according to the ASTM D3418-15+ standard. Specimens weighing approximately 8 mg were encapsulated in aluminum DSC sample pans for analysis. Initially, the specimens were equilibrated at 25° C., and then heated to 200° C. and held isothermally for 5 minutes. Then the samples were cooled back to 25° C. and held isothermally for 5 minutes. After the isothermal step, the samples were reheated to 200° C., all in a nitrogen environment and with all the ramps conducted at a rate of 10° C. per minute.

Figure 2:
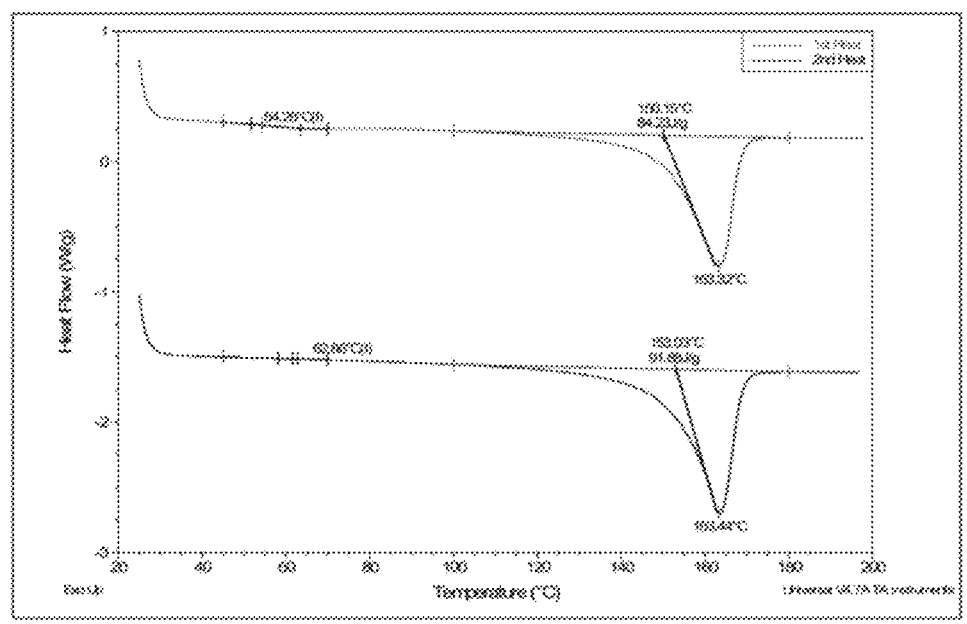
FIG. 2 shows the differential scanning calorimetric profile of the polypropylene pellet samples.
Figure 3:
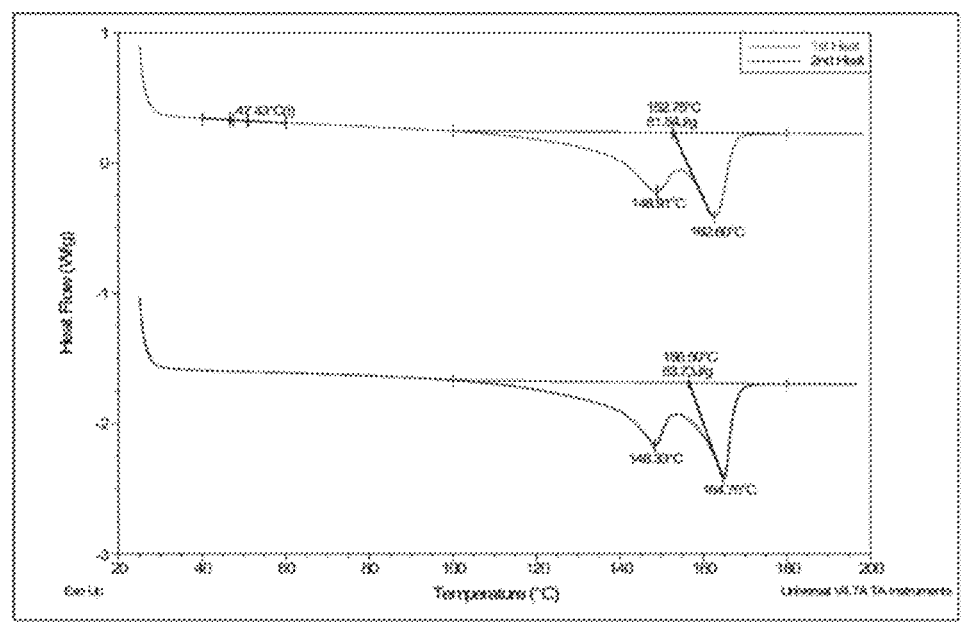
FIG. 3 shows the differential scanning calorimetric profile of the polypropylene sheet samples.

The glass transition temperatures (Tg) were measured as the inflection points of the endothermic step transitions. The endothermic transitions were integrated to measure the peak melt transition temperature (Tm), and the enthalpic heat of fusion ($\Delta H_f$). The two heating cycles were overlaid together, as shown in FIGS. 2 and 3. The as-received percent crystallinity was calculated using the enthalpy values from the transitions in the first heating cycle and a literature value for the heat of fusion for 100% crystalline PP. A summary of the results is provided in Table 7.

The enthalpy was reported as Percentage Crystallinity (% Cryst.) by normalizing the observed heat of fusion to that of a theoretical 100% crystalline sample. Literature values were for 100% crystallinity. The % Cryst. was calculated by dividing the heat of fusion ($H_f$), determined from the first heating curve, by a theoretical heat of fusion of 207 J/g for PP, and multiplying this quantity by 100:

% Cryst.=($H_f$/207 J/g)×100

The XPP Pellet sample exhibited a higher glass transition, a melt transition with only one peak, and a slightly higher as-received percent crystallinity. The melting peak for the XPP Pellet sample was observed at about 163° C. See FIG. 2.

On the other hand, the Sheet sample exhibited bimodal melt peaks: a melting temperature at 163° C. and a secondary low temperature peak at 148° C. that would be considered on the low side of PP melting temperature. See FIG. 3.

TABLE 7

Summary of DSC Results

| Sample Identification | Heat Cycle | Tg, ° C. | Tm$_1$, ° C. | Tm$_2$, ° C. | ΔHm, J/g | % Cryst. |
|---|---|---|---|---|---|---|
| XPP 802 Resin Sample in Pellet Form (B) | 1 | 54.3 | — | 163.3 | 84.2 | 40.7 |
| | 2 | 62.9 | — | 163.4 | 91.9 | |
| XPP 802 Clear Green Sheet A-B-A | 1 | 47.4 | 148.9 | 162.6 | 81.5 | 39.4 |
| | 2 | — | 148.9 | 164.8 | 83.7 | |

Isotactic polypropylene homopolymer has a high degree of crystallinity in the range of 30-60%. Here, the XPP resin pellet was indeed homopolymer based. However, the sheet sample was constructed as an A–B–A structure that is equivalent to:

Random Copolymer PP/Homopolymer XPP/Random Copolymer PP

The XPP resin sample as well as the A–B–A sheet sample showed similar % Cryst, that of about 40%. Surprisingly, the sheet sample showed a secondary low-temperature peak. As the XPP raw material in pellets is made in small batches using PP monomer in powder form, the resulting low temperature peak could be a bimodal melt transition, a blend of high molecular weight and low molecular weight PP either at the reactor or extrusion phase or a low molecular weight ethylene, rubber or a combination of both that creates a random copolymer PP or a commercially available bimodal material present in the skin layer of the ABA structure.

I.E. Score & Snap Testing

The score and snap testing was performed on three samples:
1. a 0.040-inch thick PP/XPP/PP rigid sheet;
2. a 0.020-inch thick PP/XPP/Tie/EVOH/Tie/PP plastic sheet; and
3. a 0.040-inch thick PP/XPP/Tie/EVOH/Tie/PP plastic sheet.

Plastic sheets 10 inches in length were used for testing. A narrow and shallow incision up to 0.0045 inch was cut using a disposable plastic scoring knife. The plastic sheet was placed on a work-bench with the incision facing upward and beyond the edge of the work-bench. The overhang was snapped with a quick but consistent moving impact. The incision acted as a guide for fracture propagation throughout the thickness of the sheet, separating it into two pieces with straight and relatively clean edges. The final result was a smooth and clean edged cut in the sheet across its width.

In the table below, the following designation is used:

| | |
|---|---|
| PP 6025N | PP homopolymer |
| PP R01C-00 | PP random copolymer |
| Impede ® MP 1250-TC | Barrier Polypropylene |
| PX 3838 | Linear, Low-Density Polyethylene (LLDPE) |
| BX6804B | Ethylene-Vinyl Alcohol Copolymer (EVOH) |

(2) XPP 802 polypropylene is also an experimental barrier sample. It comprises an ABA structure, where A is PP homopolymer, and the B is IMPEDE® MP 1250 polypropylene; and (3) XPTPC polypropylene is an experimental barrier sample. It is talc filled homopolymer of PP with CPS 606 barrier additive in the core layer in four different gauges designed around creamer cup and pudding cup.

Overall the trial was successful with regards to processing and output. When compared to all the variables, XPP 802 showed advantage in terms of FFS process including properties such as shrinkage, ease of forming, and trimming of parts. Note, the XPP 802 was made in 0.040" but not in 0.020" or 0.045" thin and thick gauge FFS application as the other samples.

As it relates to the XPP 803 sample, the cups looked good with clean trim. Punctures were attempted with hot cups but without success, although typically PP single-serve capsules require a minimum of a 24-hour cooling/curing period. As it relates to the XPP 802 sample, the cups did not shrink in the mold. As it relates to the XPTPC sample, the cups looked good, cloudy from the mineral filler, and the trim was clean. Punctures were attempted with hot cups but without success, although typically PP single-serve capsules require a minimum of a 24-hour cooling/curing period. These cups were the stiffest of the three samples tested.

In one experiment, the XPP 802 is tested in the thin and thick gauge on a fully functional FFS line for a 10 min test under real conditions that includes hydrogen peroxide sterilization, forming, filling, lidding, and trimming of parts. Machine and transverse direction shrinkage is evaluated to determine how the material and machine will react.

II. Extrusion Trial

An ABA coextrusion trial was run at various gauge and width to evaluate the performance of barrier-enhanced PP material for conversion into containers on current production thermoforming and form fill seal equipment. Four grades were used for the trial:

TABLE 8

Score and Snap Tests

| No. | Material Formulation | Film Type | Film Thickness | Color | Score | Snap |
|---|---|---|---|---|---|---|
| 1. | PP 6025N | Monolayer 100% | 0.02 inch | Clear | Shallow | Good |
| 2. | PP R01C-00 | Monolayer 100% | 0.015 inch | Natural | Shallow | Moderate |
| 3. | PP 6025N/Impede ® MP 1250-TC/PP 6025N | Coextrusion A/B/A: 40/20/40 | 0.04 inch | Clear | Shallow | Good |
| 4. | PP 6025N/Impede MP 1250-TC/PP 6025N | Coextrusion A/B/A: 40/20/40 | 0.04 inch | White | Shallow | Good |
| 5. | PP 6025N/Impede MP 1250-TC/PX 3838/ BX6804B/PX 3838/6025N | 6-Layer Coextrusion 25/42.5/2.5/2.5/2.5/25 | 0.02 inch | Clear | Shallow | Good |

I.F. Polypropylene Single-Serve Cups—Form-Fill-Seal Trials

Three samples were run on a Gabler M60 thermoforming machine to thermoform a container such as a cup or a capsule to replace PS in current single serve coffee pods. Any barrier film that provides an OTR under 1 cc-mil/100 in²-day is considered as a high to medium barrier material. This example relates to a thermoforming trial on PP/XPP/PP at 0.040" for single serve coffee pods.

(1) XPP 803 polypropylene is the experimental barrier PP sample. It comprises an ABA structure, where the A is a PP random copolymer, and the B is IMPEDE® MP 2250-XP1 polypropylene;

(1) XPP 801—random copolymer based. This grade was used to evaluate its performance in sheet extrusion as a polystyrene (PS) replacement for running on an FFS to determine scoring and snap-ability utilizing a standard pudding cup.

(2) XPP 802—homopolymer based. This grade was used to evaluate its performance in of in sheet extrusion as a target barrier enhancement and as PS material replacement to evaluate performance utilizing the array tray tool.

(3) XPP 803—modified random copolymer based. This grade was used to evaluate its performance in sheet extrusion and to form K-Cups on a PS tool to evaluate formability. Barrier performance testing is also conducted on the XPP803 formed sheets.

(4) PP 23H2A—random copolymer.

The trial was performed on a production scale co extruder for films having a construction of a 25/50/25 or 33/33/33. Standard extrusion parameters were used, but with accommodation for PP.

A finished sheet's gauge or thickness and width were measured using calibrated micrometer and measuring tape with online gauge measurement using Mahlo gauging unit. Moisture content test results indicated 0% of moisture. Material shrinkage test was performed on each formulation at the beginning and end of the run. For the finished sheet, the test was performed o 24 hours after the production. Results are provided below, in Table 9. The final weight layer ratio was 25/50/25.

TABLE 9

Extrusion Trials

| Trial No. | Test Material & Layer Construction | Gauge (inches) | Purpose and End Use |
|---|---|---|---|
| 1. | XP1- XPP 803.20.001 Symmetrical A/B/A 23H2A/XP1/23H2A | 0.040 | Form K-Cups on a PS tool to evaluate formability. Conduct barrier performance testing of the XPP803 on the formed cups. Coffee Pods |
| 2. | XPP 801.20.001 Symmetrical A/B/A 23H2A/XPP801/23H2A | 0.045 | Evaluation of XPP801 PP performance as a PS replacement for running on FFS for scoring and snap-ability utilizing a standard pudding cup. Pudding Cup |
| 3. | XPP 801.20.001 Symmetrical A/B/A 23H2A/XPP801/23H2A | 0.038 | Evaluation of XPP801 PP performance as a PS replacement for running on FFS for scoring and snap-ability utilizing a standard pudding cup. Pudding Cup |
| 4. | XPP 801.20.001 Symmetrical A/B/A 23H2A/XPP801/23H2A | 0.02 | Evaluation of XPP801 PP performance as a PS replacement for running on FFS for scoring and snap-ability utilizing a standard pudding cup Creamer cups |
| 5. | XPP 801.20.001 Symmetrical A/B/A 23H2A/XPP801/23H2A | 0.020 | Produce 2 sample rolls of XPP801 as a target PS material replacement to evaluate performance utilizing the array tray tool. Array Condiment Tray |
| 6. | XPP 801.20.001 Symmetrical A/B/A 23H2A/XPP801/23H2A | 0.0175 | Produce 2 sample rolls of XPP801 as a target PS material replacement to evaluate performance utilizing the array tray tool. Array Condiment Tray |
| 7. | XPP 802.20.001 Symmetrical A/B/A 23H2A/XPP802/23H2A | 0.0175 | Produce 2 sample rolls of XPP802 as a target PS material replacement to evaluate performance utilizing the array tray tool. Array Condiment Tray |
| 8. | XPP 802.20.001 Symmetrical A/B/A 23H2A/XPP802/23H2A | 0.020 | Produce 2 sample rolls of XPP802 as a target PS material replacement to evaluate performance utilizing the array tray tool. Array Condiment Tray |
| 9. | XPP 802.20.001 Symmetrical A/B/A 23H2A/XPP802/23H2A | 0.040 | Form K-Cups on a PS tool to evaluate formability. Conduct barrier performance testing of the XPP802 on the formed cups to develop additional data. Coffee Pods |
| 10. | XPP 802.20.001 Symmetrical A/B/A 23H2A/XPP802/23H2A | 0.040 | Produce 2 sample rolls of XPP802 as a target PS material replacement to evaluate performance utilizing the array tray tool. Pudding Cup |
| 11. | XPTPC.20.001 A/B/A Symmetrical Exxon 6282NE2 30% Talc "ABA", 10% Prisma 6810 "ABA", 25% CPS 606 "B" layer only | 0.038 | Evaluation of proposed filled ABA PP structure as a PS replacement for running on FFS for scoring and snap-ability utilizing a standard pudding cup Pudding Cup |
| 12. | XPTPC.20.001 A/B/A Symmetrical Exxon 6282NE2 30% Talc "ABA", 10% Prisma 6810 "ABA", 25% CPS 606 "B" layer only | 0.040 | Evaluation of proposed talc filled ABA PP structure to be run on the K-Cup tooling to evaluate shrink and conduct barrier testing using alternate structure components. Coffee Pods |
| 13. | XPTPC.20.001 A/B/A Symmetrical Exxon 6282NE2 30% Talc "ABA", 10% Prisma 6810 "ABA", 25% CPS 606 "B" layer only | 0.020 | Evaluation of proposed filled ABA PP structure as a PS replacement to evaluate performance utilizing the array tray tool. Array Condiment Tray |

III. Additional Examples

III.A. Examples

Figure 4:
FIG. 4 shows cups made from roll-stock or rigid sheets of the present invention.

As shown in FIG. 4, cups are made from roll-stock or rigid sheets of the present invention described in this disclosure. This roll-stock provides barrier and stiffness enhancements over traditional PS and PP for thermoformed & form-fill-seal food and medical packaging. This roll-stock is compatible with processes including: Aseptic, Hot-Fill, Retort, modified atmosphere packaging (MAP), HPP, FFS & FS for a variety of end-use applications. It offers controlled shrinkage and enhanced stiffness for drop-in replacement of PS in thermoformed & FFS food packaging. In one embodiment, it also offers barrier improvements up to 90%/90% OTR/MVTR vs traditional PP and 100%/150% OTR/MVTR versus traditional PS without use of a specialty barrier material or coating. Because of the enhanced stiffness, this material offers down-gauging potential. In one embodiment, this roll-stock comprises homopolymer PP, which includes at least one layer that comprises at least one grade of the Impede® resin. In one embodiment, the roll-stock is extruded in thickness range from 0.010"-0.20" based on customer application. In one embodiment, the roll-stock is white in color. In another embodiment, the roll-stock is natural colored. In one embodiment, the roll-stock is made from the XPP802 material grades.

III.B. Example

Figure 5:
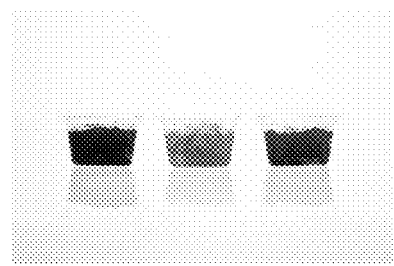
FIG. 5 also shows cups made from roll-stock or rigid sheets of the present invention.

As shown in FIG. 5, cups are made from roll-stock or rigid sheets of the present invention described in this disclosure. This roll-stock provides barrier and stiffness enhancements over traditional PS and PP for thermoformed & form-fill-seal food and medical packaging. This roll-stock is compatible with processes including: Aseptic, Hot-Fill, Retort, M.A.P., HPP, FFS & FS for a variety of end-use applications. In one embodiment, it offers controlled shrinkage and enhanced stiffness for drop-in replacement of PS in thermoformed & FFS food packaging. In one embodiment, it also offers barrier improvements up to 90%/90% OTR/MVTR vs traditional PP and 100%/150% OTR/MVTR vs traditional PS and EVOH layer provides added OTR barrier protection for shelf-stable food packaging. In one embodiment, this roll-stock comprises homopolymer PP, which includes at least one layer that comprises at least one grade of the Impede® resin. In one embodiment, the roll-stock is extruded in thickness range from 0.010"-0.20" based on customer application. In one embodiment, the PP layer comprises the Impede® layer (the total weight % of PP is 92.5%), with 5% LDPE layer, and 2.5% EVOH layer. In one embodiment, the roll-stock is white in color. In another embodiment, the roll-stock is natural colored. In one embodiment, the PP layer is white. In another embodiment, the PP layer is natural colored. In another embodiment, the roll-stock is made from XPP 803 material grades.

II.C. Examples—XPP Enhanced Barrier Polypropylene for Thermoformed & Form-Fill-Seal Food Packaging III.C.1. Design In one aspect, the XPP is a mono-material polypropylene roll-stock that offers enhanced OTR and MVTR barrier without the use of specialty barrier materials or coatings for thermoformed and form-fill-seal food packaging applications.

In one embodiment, the extruded rigid plastic roll-stock of this invention is used in thermoforming and FFS processes for various food packaging applications. However, XPP Enhanced Barrier Polypropylene roll-stock offers improvements to key performance criteria to achieve key performance requirements, including:
Replacement of PS in food packaging according to Proposition 65 guidelines
Improved barrier performance
Improved sustainability and recyclability
Compatibility with existing equipment and processes
Drop-in replacement of polystyrene in form-fill-seal processes In one aspect, the package made from the roll-stock of the present invention successfully protects the biological, chemical and/or physical integrity of the product. Polyolefins naturally possess excellent Moisture Vapor Transmission Rates (MVTR) but require use of barrier materials such as EVOH to achieve the oxygen barrier protection needed for shelf-stable and extended shelf-life food packaging. The polymeric film structures of the present invention deliver a dramatic improvement to both the Oxygen Transmission Rate (OTR) and the MVTR in comparison to other commodity thermoplastic materials—and in some embodiments, even without the use of specialty barrier materials or coatings—offering:
90%/90% improvement to OTR/MVTR vs traditional polypropylene
100%/150% improvement to OTR/MVTR vs polystyrene This improvement to barrier properties allows for the use of polymeric film structures in packaging applications where traditionally functional barrier material such as EVOH or Nylon were the only solution. As a result, material solutions are simplified and thus more easily recyclable. In addition, polypropylene materials offer higher thermal stability than polystyrene and polyethylene terephthalate and allow for use in freezer and microwave applications without compromising the integrity of the product or the packaging.

Packing/Processing Efficiencies: The polymeric film structures of the present invention are produced from polypropylene and therefore offer a 12% density reduction in comparison to PS and a 30% density reduction in comparison to PET. This density reduction results in a higher yield (more parts) during thermoforming processes, lighter-weight parts, less solid waste by weight, and reduced material usage in comparison to PS and PET.

The polymeric film structures of the present invention are advantageous to a package's life cycle, as demonstrated by the following:

III.C.2. Recyclability

In one aspect, in comparison to other barrier material structures produced from a complex mix of materials, the polymeric film structures of the present invention are produced from polypropylene materials, and can therefore be recycled using the polypropylene Resin ID Code #5. Comparative barrier materials such as HIPS/PVDC must use the Resin ID Code #7, which limits opportunities for recycling and re-use in other applications. In addition, the polymeric film structures of the present invention can be processed like other thermoplastics (without crosslinking) and can thus be recycled easily. The polymeric film structures of the present invention can be recycled multiple times either in a closed loop system or as part of the circular economy without losing its structural integrity. The polymeric film structures of the present invention can therefore be recycled back into various utility applications maintaining its mechanical properties after multiple heat histories.

III.C.3. Material Reduction

In one aspect, the increased rigidity and stiffness of the polymeric film structures of the present invention not only allow for drop-in processing for polystyrene replacement initiatives, but also present opportunities to down-gauge material structures, resulting in reduced material usage, increased yield, and lighter-weight parts. For example, in one embodiment, the polymeric film structures of the present invention allow for thermoforming using a 0.0175" roll-stock with comparative barrier results and similar functional and processing characteristics in formed parts as a result of the increased stiffness attributes of the polymeric film structures of the present invention. In comparison, commercial structures used for similar parts are typically produced using 0.020" high-impact polystyrene (HIPS) roll-stock. This example represents a 12.5% reduction in gauge, which would amount to a potential reduction in use of plastic materials annually, to the tune of hundreds of thousands of pounds. This reduction would be over and above the materials savings that can be potentially realized through material replacement as a result of polypropylene's light weight and low density.

III.C.4. Performance
Running on Existing Packaging Machinery

In one aspect, the polymeric film structures of the present invention offer enhanced stiffness and controlled shrinkage, allowing for processing on existing thermoforming and FFS platforms, without the need for modifications or additional capital expenditure.

III.C.5. Controlled Shrinkage

In one aspect, the polymeric film structures of the present invention offer controlled shrinkage allowing for drop-in processing on existing thermoforming and form-fill-seal systems and platforms. This is an inherent characteristic of the material and is accomplished without the use of mineral fillers such as talc or calcium carbonate, thus maintaining the polypropylene density and its ability to sort for subsequent recycling.

III.C.6. Increased Stiffness

Traditional polystyrene (PS) materials offer flex modulus/stiffness numbers of about 300 KPsi. In comparison, in one aspect of the invention, XPP materials offer over 30% improved stiffness, resulting in a stronger and more rigid film compared to traditional PP and PS. This increase in rigidity and stiffness maintains the "snap-ability" and "scorability" of PS required in certain Form-Fill-Seal multi-pack applications. This key functionality allows for application versatility and the ability to replace traditionally non-recyclable materials such as high-impact polystyrene (HIPS) and polyvinylidene chloride (PVDC) with a fully-recyclable solution without sacrificing functional attributes and processing characteristics.

The polymeric film structures of the present invention that are thin-gauge roll-stock serve as a drop-in material replacement solution for PS in rigid thermoformed and form-fill-seal packaging. The polymeric film structures of the present invention can be successfully prepared on equipment designed for the processing of PS for food packaging applications without significant modifications to existing equipment and platforms.

III.C.7. Environmental Impact

The global demand for plastic waste reduction and more sustainable packaging solutions, coupled with health and safety concerns as a result of Proposition 65, have resulted in widespread initiatives to replace polystyrene (PS)—the favored material for Form-Fill-Seal processing—in food packaging applications. In one embodiment, the XPP roll-stock allows for successful transition of food packaging out of PS, replacing it with a sustainable, recyclable and Proposition 65 compliant polymeric film structures of the present invention.

In addition, the low density and lightweight nature of polypropylene allow for a more sustainable packaging, resulting in less solid waste by weight, less $CO_2$ equivalents by weight, lower fuel consumption and fewer emissions. Also, enhanced stiffness attribute of the polymeric film structures of the present invention allow for the down-gauging of existing structures, which reduces overall material usage significantly. In addition, the inherent barrier properties of the polymeric film structures of the present invention allow for structure simplification and easier recycling.

In one aspect, the polymeric film structures of the present invention offers inherent barrier improvements in comparison to other commercial packaging materials without the use of mineral fillers or additives. These improvements to barrier properties presents the opportunity to optimize structures and, in some cases, reduce or eliminate the use of additional materials typically found in barrier packaging structures depending on the application.

The polymeric film structures of the present invention comprise polypropylene and therefore can be recycled in the polypropylene recycling stream.

The inherent barrier properties of the polymeric film structures of the present invention along with the application versatility of the material allows for an extended shelf-life of commercially packaged food products, and thus the potential to contribute to the long-term goal of reduced waste.

IV. Oxygen Barrier Properties

In the table below is provided a summary of the nanoindentation data on a monolayer sample A (regular PP), and monolayer B (comprising the polypropylene 2-layer stack). The testing was conducted with two different geometry tips: one conical, one "berkovich" or a 3-sided pyramid. Some shorter tests (5s-loading, 2s-hold, and 5s-unloading), as well as some longer tests (20s-loading, 30s-hold, 20s-unloading) were also conducted, each to a max load of 1 mN.

In the first step, samples were super-glued to magnetic specimen disks. Then, forty indentations were made, and averages and standard deviations were calculated. The table below provides numbers for moduli and hardness at different tip loadings and testing durations. It should be noted that the conical-tip indentation showed a higher measured hardness. This can be expected because it causes less deformation at lower loads when compared to the sharper berkovich tip.

From the observations, the polymeric film structures of the present invention designated as XPP elsewhere, showed higher surface modulus and hardness when compared to the PP and in a statistically significant way.

While not wishing to be bound by theory, the crystallization kinetics of the regular PP (A) and XPP (B) are significantly different such that the crystal size and density, and therefore, the microstructure formed during the extrusion of these materials are discernably different. Consequently, this results in different hardness and modulus measurements at the "nano scale" as evidenced from below data. The data also further substantiate the bulk tensile and flex properties obtained on specimens made from PP (A and A') and XPP (B), which show material differences in modulus, stiffness, and flexural-strength properties between the two materials, A and B. For example, when a sandwich structure A/B/A' is co-extruded with the above materials, the crystallization kinetics—and therefore microstructure of the bulk regions—would have similar performance as shown below and a gradient in properties across the two A/B and B/A' interface/interphase regions.

It has been found that from transport phenomena standpoint—and in this case oxygen transmission through the bulk materials A and B and sandwich structure A/B/A—the transport data and barrier data directionally follow the crystallization kinetics and microstructure formed, post-extrusion, of these polymeric film structures.

Material A shows the lowest barrier, which translates to lower % of crystallinity, well-defined larger crystal domains, and lower crystal density.

Material B shows higher barrier owing likely to the nucleating agent, which facilitates rapid crystal formation, higher % crystallinity as evidenced by DSC, and higher crystal density and random crystal formation which are not well defined.

Once materials A and B are combined and co-extruded into an A/B/A' structure, the same dynamic as above plays out, but a "material" difference is evident in the discontinuity and/or the gradient (collectively, "discontinuity") of properties that occurs at the A/B and B/A' interfaces. Without wishing to be bound by any theory, it is surmised that the discontinuity going from one type of microstructure to another distinct microstructure disrupts transport phenomena. In essence, this discontinuity causes a more tortuous path for the oxygen molecule moving from a bulk A polymer to an A/B interface/interphase and into the bulk B polymer and subsequently into the B/A' interphase region and into the bulk A' polymer. This effectively explains why the A/B/A' structure has a 2-3× higher barrier performance (oxygen barrier) versus a bulk B specimen.

TABLE 10

Modulus and Hardness for Polypropylene and Polymeric Film Structures of the Present Invention

| | | | | |
|---|---|---|---|---|
| Modulus in GPa | | | | |
| PP--A | Conical | Long | 2.92 | 0.07 |
| PP--A | Conical | Short | 3.19 | 0.04 |
| XPP--B | Conical | Long | 5.16 | 0.16 |
| XPP--B | Conical | Short | 5.09 | 0.40 |
| PP--A | Berkovich | Long | 3.58 | 0.17 |
| PP--A | Berkovich | Short | 3.58 | 0.24 |
| XPP--B | Berkovich | Long | 5.42 | 1.19 |
| XPP--B | Berkovich | Short | 4.94 | 0.59 |
| Hardness in GPA | | | | |
| PP--A | Conical | Long | 264.94 | 2.66 |
| PP--A | Conical | Short | 290.55 | 3.49 |
| XPP--B | Conical | Long | 339.20 | 22.36 |
| XPP--B | Conical | Short | 328.44 | 61.27 |
| PP--A | Berkovich | Long | 184.57 | 7.22 |
| PP--A | Berkovich | Short | 213.60 | 19.93 |
| XPP--B | Berkovich | Long | 262.49 | 56.25 |
| XPP--B | Berkovich | Short | 253.08 | 78.00 |

The invention claimed is:

1. A co-extruded multi-layer polymeric film, comprising at least one 2-layer stack A-B1, wherein the first layer of the 2-layer stack is A and the second layer of the 2-layer stack is B1, wherein:
   A is a layer comprising predominately polypropylene,
   B1 is a layer comprising predominately polypropylene and 50 wt. % or less of a hydrocarbon resin; and
   wherein said two layers in said 2-layer stack are contactably adjacent each other; and
   wherein the co-extruded multi-layer polymeric film comprises:
   (I) an outside layer comprising polyethylene;
   (II) a core layer comprising EVOH; and
   (III) an inside layer comprising polyethylene;
   wherein the outside layer and the inside layer comprise at least one 2-layer stack A-B1.

2. The co-extruded multi-layer polymeric film as recited in claim 1, further comprising one layer from the following set of layers, or more than one layer from the following set of layers:
   (A) at least one layer comprising predominately polyolefin;
   (B) at least one layer comprising predominately polypropylene;
   (D) at least one layer comprising predominately polypropylene and 50 wt. % or less of a hydrocarbon resin;
   (E) at least one layer comprising predominately polyethylene polymer or interpolymer;
   (F) at least one barrier layer comprising EVOH;
   (G) at least one barrier layer comprising predominately nylon;
   (H) at least one barrier layer, comprising predominately polyester;
   (I) at least one tie layer; and
   (J) a combination of the above layers.

3. The co-extruded multi-layer polymeric film as recited in claim 1, comprising three layers in the following order:
   (I) a first layer comprising predominately polypropylene;
   (II) a second layer comprising predominately polypropylene and 50 wt. % or less of a hydrocarbon resin, and
   (III) a third layer comprising predominately polypropylene.

4. A co-extruded multi-layer polymeric film, comprising:
   (I) an outside layer stack, comprising one or more layers, wherein:
      (A) optionally at least one layer of said outside layer stack comprises polyethylene polymer or polyethylene interpolymer; and
      (B) optionally said outside layer stack comprises at least one 2-layer stack as recited in claim 1;
   (II) a core layer stack comprising, one or more layers, wherein:
      (C) optionally at least one layer of said core layer stack comprises polyethylene polymer or polyethylene interpolymer; and
      (D) optionally said core layer stack comprises at least one 2-layer stack;
      and
      (E) optionally at least one layer of said core layer stack comprises EVOH;
   and
   (III) an inside layer stack, comprising one or more layers, wherein:
      (F) optionally at least one layer of said inside layer stack comprises polyethylene polymer or polyethylene interpolymer; and
      (G) optionally said inside layer stack comprises at least one 2-layer stack;
   wherein said polyethylene interpolymer comprises:
      (a) optionally a first ethylene/α-olefin copolymer fraction having a density in the range of 0.894 to 0.908 g/cm3; a melt index in the range of 0.2 to 1 dg/min; and
      (b) optionally a second ethylene/α-olefin copolymer fraction having a density in the range of from about 0.910 to 0.924 g/cm$^3$, a melt index in the range from 0.5 to 2 g/10 min, a zero shear viscosity ratio (ZSVR) in the range of from about 1.15 to 2.5; a molecular weight distribution, expressed as the ratio of the weight average molecular weight to number average molecular weight (Mw/Mn), in the range of 2.0 to 4.0.

5. The co-extruded multi-layer polymeric film of claim 1, comprising a number of layers selected from the range of 2 layers through 100 layers.

6. The co-extruded multi-layer polymeric film of claim 1, wherein the weight percent of said EVOH copolymer to that of said co-extruded multi-layer polymeric film is in the range of from about 0.1% to about 10%.

7. The co-extruded multi-layer polymeric film of claim 6, wherein the mole percent of ethylene in said EVOH copolymer is in the range of from about 10% to about 55%.

8. The co-extruded multi-layer polymeric film as recited in claim 1, wherein the co-extruded multi-layer polymeric film exhibits a DTUL of 30° C. or more and a flexural secant modulus of 500 MPa or more.

9. The co-extruded multi-layer polymeric film as recited in claim 1, wherein the thickness of the film ranges from about 5 μm to about 1600 μm.

10. The co-extruded multi-layer polymeric film as recited in claim 1, wherein the hydrocarbon resin in the second layer B1 comprises an aliphatic hydrocarbon resin, an aliphatic/aromatic hydrocarbon resin, an aromatic hydrocarbon resin, a polyterpene resin, a terpene-phenol resin, a rosin ester, a rosin acid, or a mixture thereof.

11. The co-extruded multi-layer polymeric film as recited in claim 1, wherein the hydrocarbon resin in the second layer B1 is partially hydrogenated or fully hydrogenated.

12. The co-extruded multi-layer polymeric film as recited in claim 1, wherein the hydrocarbon resin in the second layer B1 comprises a polycyclopentadiene.

13. The co-extruded multi-layer polymeric film as recited in claim 1, wherein the hydrocarbon resin in the second layer B1 has a weight average molecular weight of from about 400 g/mol to about 5,000 g/mol.

14. The co-extruded multi-layer polymeric film as recited in claim 1, wherein the hydrocarbon resin comprises an aromatic $C_9$ hydrogenated resin having a ring and ball softening point of 110° C. or more.

15. The co-extruded multi-layer polymeric film as recited in claim 1, which is characterized by a water vapor transmission rate of 3.0 $cm^3/m^2$/day, or less, and/or an oxygen transmission rate of 60 $cm^3$/100 $in^2$/day, or less.

16. The co-extruded multi-layer polymeric film as recited in claim 1, wherein the second layer B1 further comprises a nucleating agent selected from sodium benzoate, talc, glycerol alkoxide salts, cyclic carboxylic acid salts, bicyclic carboxylic acid salts, glycerolates, phosphines, phosphates, diols, hexahydrophtalic acid salts, amides, and sugar alcohols.

17. The co-extruded multi-layer polymeric film as recited in claim 16, wherein said nucleating agent is selected from:
mannitol or mannitol based compounds; sorbitol or sorbitol based compounds;
nonitol or nonitol based compounds, 1,2,3-trideoxy-4,6:5,7-bis-O-((4-propylphenyl) methylene) nonitol;
2,4,8,10-tetra(tert-butyl)-6-hydroxy-12H-dibenzo[d,g][1,3,2]diox-aphosphocin 6-oxide; a salt of 2,4,8, 10-tetra(tert-butyl)-6-hydroxy-12H-dibenzo[d,g][1,3,2]dioxaphosphocin 6-oxide; sodium salt of 2,4,8,10-tetra(tert-butyl)-6-hydroxy-12H-dibenzo[d,g][1,3,2]dioxaphosphocin 6-oxide; hydroxy-bis[2,2'-methylenebis[4,6-di(tert-butyl)phenyl]phosphate; 2,2'-methylenebis (4,6-di-tert-butylphenyl)phosphate;
a salt thereof; a sodium salt thereof; an aluminum salt thereof; a lithium salt thereof;
(1R)-1-[(4R,4aR,8aS)-2,6-bis(3,4-dimethylphenyl)-4,4a,8,8a-tetrahydro-[1,–3]dioxino[5,4-d][1,3]dioxin-4-yl]ethane-1,2-diol; 1-[8-propyl-2,6-bis(4-propylphenyl)-4,4a,8,8a-tetrahydro-[1,3]dioxino[5,4-d][1,3]dioxin-4-yl]ethane-1,2-diol; N-[3,5-bis(2,2-dimethylpropanoylamino)phenyl]-2,2-dimethylpropanamide); a salt of (1S,2R)-cyclohexane-1,2-dicarboxylate with zinc octadecenoate; a calcium salt of (1S,2R)-cyclohexane-1,2-dicarboxylate with zinc octadecenoate; cis-endo-bicyclo [2,2, 1]heptane-2,3-dicarboxylic acid disodium salt with 13-docosenamide;
amorphous silicon dioxide;
bicycloheptane dicarboxylic acid; bicyclo [2.2.1] heptane dicarboxylate;
cyclohexanedicarboxylic acid; a calcium salt of cyclohexanedicarboxylic acid; a blend of cyclohexanedicarboxylic acid, the calcium salt of cyclohexanedicarboxylic acid, and zinc stearate; and
a mixture of two or more nucleating agents thereof.

18. A shaped polymeric article comprising the co-extruded multi-layer polymeric film of claim 1.

19. The shaped polymeric article of claim 18, wherein the shaped polymeric article is a thermoformed shaped polymeric article.

20. The shaped polymeric article of claim 18, which is a container for packaging food product.

21. The container as recited in claim 20, wherein, the co-extruded multi-layer polymeric film further comprises one layer from the following set of layers, or more than one layer from the following set of layers:
(A) at least one layer comprising predominately polyolefin;
(B) at least one layer comprising predominately polypropylene;
(D) at least one layer comprising predominately polypropylene and 50 wt. % or less of a hydrocarbon resin;
(E) at least one layer comprising predominately polyethylene polymer or interpolymer;
(F) at least one barrier layer comprising EVOH;
(G) at least one barrier layer comprising predominately nylon;
(H) at least one barrier layer, comprising predominately polyester;
(I) at least one tie layer; and
(J) a combination of the above layers.

22. The container as recited in claim 20, wherein the co-extruded multi-layer polymeric film comprises three layers in the following order:
(I) a first layer comprising predominately polypropylene;
(II) a second layer comprising:
predominately polypropylene and 50 wt. % or less of a hydrocarbon resin,
and
(III) a third layer comprising predominately polypropylene.

23. The container as recited in claim 20, wherein the co-extruded multi-layer polymeric film comprises:
(I) an outside layer stack, comprising one or more layers, wherein:
(A) optionally at least one layer of said outside layer stack comprises polyethylene polymer or polyethylene interpolymer; and
(B) optionally said outside layer stack comprises at least one 2-layer stack as recited in claim 1;
(II) a core layer stack comprising, one or more layers, wherein:
(C) optionally at least one layer of said core layer stack comprises polyethylene polymer or polyethylene interpolymer; and
(D) optionally said core layer stack comprises at least one 2-layer stack;
and
(E) optionally at least one layer of said core layer stack comprises EVOH;
and
(III) an inside layer stack, comprising one or more layers, wherein:
(F) optionally at least one layer of said inside layer stack comprises polyethylene polymer or polyethylene interpolymer; and
(G) optionally said inside layer stack comprises at least one 2-layer stack;

wherein said polyethylene interpolymer comprises:
(a) optionally a first ethylene/α-olefin copolymer fraction having a density in the range of 0.894 to 0.908 g/cm$^3$; a melt index in the range of 0.2 to 1 dg/min; and
(b) optionally a second ethylene/α-olefin copolymer fraction having a density in the range of from about 0.910 to 0.924 g/cm$^3$, a melt index in the range from 0.5 to 2 g/10 min, a zero shear viscosity ratio (ZSVR) in the range of from about 1.15 to 2.5; a molecular weight distribution, expressed as the ratio of the weight average molecular weight to number average molecular weight (Mw/Mn), in the range of 2.0 to 4.0.

24. The container as recited in claim 20, wherein the co-extruded multi-layer polymeric film comprises a number of layers selected from the range of 2 layers through 100 layers.

25. The container as recited in claim 21, wherein the weight percent of said EVOH copolymer to that of said co-extruded multi-layer polymeric film is in the range of from about 0.1% to about 10%.

26. The container as recited in claim 25, wherein the mole percent of ethylene in said EVOH copolymer is in the range of from about 10% to about 55%.

27. A process for preparing a co-extruded multi-layer polymeric film as recited in claim 1, comprising the steps of:
(I) providing the layer A, and
(II) providing the layer comprising B1;
wherein said A and said B1 form an interface or interphase at their adjacent boundaries such that the interphase provides discontinuity in properties between the two layers to provide improvement in barrier properties of the co-extruded multi-layer polymeric film.

28. A container for packaging food product prepared from a rigid co-extruded multi-layer polymeric film prepared by the process of claim 27.

29. A shaped polymeric article comprising the co-extruded multi-layer polymeric film of claim 17.

30. The shaped polymeric article of claim 29, wherein the shaped polymeric article is a thermoformed shaped polymeric article.

31. A laminated structure comprising a co-extruded multi-layer polymeric film, the polymeric film comprising at least one 2-layer stack A-B1, wherein:
the first layer of the 2-layer stack is A and the second layer of the 2-layer stack is B1;
A is a layer comprising predominately polypropylene;
B1 is a layer comprising predominately polypropylene and 50 wt. % or less of a hydrocarbon resin;
said two layers in said 2-layer stack are contactably adjacent each other; and
wherein the laminate structure thickness is in the range of 5 μm to 1600 μm.

* * * * *